(12) United States Patent
Komanduri et al.

(10) Patent No.: US 10,404,955 B2
(45) Date of Patent: Sep. 3, 2019

(54) PROJECTION AND/OR WAVEGUIDE ARRANGEMENTS FOR A SOFTWARE CONFIGURABLE LIGHTING DEVICE

(71) Applicant: ABL IP HOLDING LLC, Conyers, GA (US)

(72) Inventors: Ravi Kumar Komanduri, Dulles, VA (US); Guan-Bo Lin, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 107 days.

(21) Appl. No.: 15/363,437

(22) Filed: Nov. 29, 2016

(65) Prior Publication Data

US 2017/0163946 A1   Jun. 8, 2017

Related U.S. Application Data

(60) Provisional application No. 62/262,071, filed on Dec. 2, 2015.

(51) Int. Cl.
*H04N 9/31* (2006.01)
*F21V 7/00* (2006.01)
(Continued)

(52) U.S. Cl.
CPC ............ *H04N 9/3155* (2013.01); *F21V 7/00* (2013.01); *F21V 9/08* (2013.01); *F21V 13/08* (2013.01); *F21V 14/04* (2013.01); *H04N 9/312* (2013.01); *H04N 9/3129* (2013.01); *H04N 9/3141* (2013.01); *H04N 9/3147* (2013.01); *H04N 9/3179* (2013.01); *H05B 33/0842* (2013.01);
(Continued)

(58) Field of Classification Search
CPC . F21V 7/00; F21V 14/04; F21V 13/08; F21V 9/08; H04N 9/3179; H04N 9/3155; H04N 9/312; H04N 9/3129; H04N 9/3141; H04N 9/3147
USPC ......... 345/156; 348/552, 745, 752; 362/294, 362/231
See application file for complete search history.

(56) References Cited

U.S. PATENT DOCUMENTS 8,177,390 B2   5/2012  Miskin
9,304,379 B1*  4/2016  Wang ................... H04N 9/3182
(Continued)

FOREIGN PATENT DOCUMENTS

WO   2015054797 A1   4/2015

OTHER PUBLICATIONS

International Search Report and Written Opinion for International application No. PCT/US2016/063942, dated Apr. 7, 2017, 21 pages.
(Continued)

*Primary Examiner* — Paulos M Natnael
*Assistant Examiner* — Sean N. Haiem
(74) *Attorney, Agent, or Firm* — RatnerPrestia

(57) ABSTRACT

The examples relate to various implementations of a software configurable lighting device utilizing a projection and/or waveguide-based lighting system that offers the capability to present an image display and/or provide general illumination lighting of a space according to an image display selection and/or general illumination distribution selection. A controller generates control signals that cause the projection and/or waveguide-based lighting system to output the selected images and general illumination.

8 Claims, 15 Drawing Sheets

(51) Int. Cl.
  *F21V 9/08*  (2018.01)
  *F21V 13/08*  (2006.01)
  *F21V 14/04*  (2006.01)
  *H05B 33/08*  (2006.01)
  *H05B 37/02*  (2006.01)

(52) U.S. Cl.
  CPC ..... *H05B 33/0845* (2013.01); *H05B 37/0272* (2013.01)

(56) References Cited

U.S. PATENT DOCUMENTS

| | | | |
|---|---|---|---|
| 2002/0080617 A1 | 6/2002 | Niwa et al. | |
| 2005/0047134 A1* | 3/2005 | Mueller | F21V 23/0442 362/231 |
| 2005/0276053 A1* | 12/2005 | Nortrup | F21S 48/325 362/294 |
| 2007/0145915 A1* | 6/2007 | Roberge | F21K 9/00 315/312 |
| 2008/0246781 A1* | 10/2008 | Surati | H04N 5/74 345/690 |
| 2009/0128481 A1* | 5/2009 | Shih | G09G 3/346 345/156 |
| 2010/0109536 A1 | 5/2010 | Jung et al. | |
| 2010/0157026 A1 | 6/2010 | Reichelt | |
| 2010/0328611 A1* | 12/2010 | Silverstein | H04N 9/3155 353/7 |
| 2011/0134344 A1* | 6/2011 | Marcus | H04N 9/3105 348/752 |
| 2013/0300637 A1 | 11/2013 | Smits et al. | |
| 2015/0035440 A1* | 2/2015 | Spero | B60Q 1/04 315/153 |
| 2015/0062446 A1* | 3/2015 | Schreiber | H04N 9/317 348/745 |
| 2015/0181097 A1 | 6/2015 | Spielberg | |
| 2015/0235458 A1 | 8/2015 | Schowengerdt et al. | |
| 2017/0098400 A1* | 4/2017 | Yamakawa | G02B 26/10 |

OTHER PUBLICATIONS

"Optical Performance of the Grating Light Valve Technology", David T. Amm et al., Silicon Light Machines, Sunnyvale, CA 94089, 1999, 7 pages.

Beam Labs, "Beam. The smart projector that fits in any light socket" downloaded Oct. 20, 2016 from http://beamlabsinc.com/ © 2016 Beam Labs BV, The Netherlands, 5 pages.

Amazon Launchpad, "Beam, the Smart Projector that Fits in Any Light Socket by Beam", downloaded on Oct. 20, 2016 from https://www.amazon.com/Beam-Smart-Projector-Light-Socket/dp/B017IKR2NM—Interest Based Ads © 1996-2016, Amazon.com, Inc. or its affiliates, 5 pages.

* cited by examiner

PROJECTION AND/OR WAVEGUIDE ARRANGEMENTS FOR A SOFTWARE CONFIGURABLE LIGHTING DEVICE

CROSS-REFERENCE TO RELATED APPLICATION

This application claims the benefit of U.S. Provisional Application No. 62/262,071, filed Dec. 2, 2015 and entitled "Projection and/or Waveguide Arrangements for a Software Configurable Lighting Device," the entire contents of which are incorporated herein by reference.

TECHNICAL FIELD

The present subject matter relates to lighting devices, and to configurations and/or operations thereof, whereby a lighting device is configurable by software, e.g. to selectively provide an image and to provide general illumination using a projection and/or waveguide arrangement.

BACKGROUND

Electrically powered artificial lighting has become ubiquitous in modern society. Electrical lighting devices are commonly deployed, for example, in homes, buildings of commercial and other enterprise establishments, as well as in various outdoor settings.

In conventional lighting devices, the luminance output can be turned ON/OFF and often can be adjusted up or dimmed down. In some devices, e.g. using multiple colors of light emitting diode (LED) type sources, the user may be able to adjust a combined color output of the resulting illumination. The changes in intensity or color characteristics of the illumination may be responsive to manual user inputs or responsive to various sensed conditions in or about the illuminated space. The optical distribution of the light output, however, typically is fixed. Various different types of optical elements are used in such lighting devices to provide different light output distributions, but each type of device has a specific type of optic designed to create a particular light distribution for the intended application of the lighting device. The dimming and/or color control features do not affect the distribution pattern of the light emitted from the luminaire.

To the extent that multiple distribution patterns are needed for different lighting applications, multiple luminaires must be provided. To meet the demand for different appearances and/or different performance (including different distributions), a single manufacturer of lighting devices may build and sell thousands of different luminaires.

Some special purpose light fixtures, for example, fixtures designed for stage or studio type lighting, have implemented mechanical adjustments. Mechanically adjustable lenses and irises enable selectable adjustment of the output light beam shape, and mechanically adjustable gimbal fixture mounts or the like enable selectable adjustment of the angle of the fixture and thus the direction of the light output. The adjustments provided by these mechanical approaches are implemented at the overall fixture output, provide relatively coarse overall control, and are really optimized for special purpose applications, not general lighting.

There have been more recent proposals to develop lighting devices offering electronically adjustable light beam distributions, using a number of separately selectable/controllable solid state lamps or light engines within one light fixture. In at least some cases, each internal light engine or lamp may have an associated adjustable electro-optic component to adjust the respective light beam output, thereby providing distribution control for the overall illumination output of the fixture.

Although the more recent proposals provide a greater degree of distribution adjustment and may be more suitable for general lighting applications, the outward appearance of each lighting device remains the same even as the device output light distribution is adjusted. There may also be room for still further improvement in the degree of adjustment supported by the lighting device.

There also have been proposals to use displays or display-like devices mounted in or on the ceiling to provide variable lighting. The Fraunhofer Institute, for example, has demonstrated a lighting system using luminous tiles, each having a matrix of red (R) LEDs, green (G), blue (B) LEDs and white (W) LEDs as well as a diffuser film to process light from the various LEDs. The LEDs of the system were driven to simulate or mimic the effects of clouds moving across the sky. Although use of displays allows for variations in appearance that some may find pleasing, the displays or display-like devices are optimized for image output and do not provide particularly good illumination for general lighting applications. A display typically has a Lambertian output distribution over substantially the entire surface area of the display screen, which does not provide the white light intensity and coverage area at a floor or ceiling height offered by a similarly sized ceiling-mounted light fixture. Liquid crystal displays (LCD) also are rather inefficient. For example, backlights in LCD televisions have to produce almost ten times the amount of light that is actually delivered at the viewing surface. Therefore, any LCD displays that are to be used as lighting products need to be more efficient than typical LCD displays for the lighting device implementation to be commercially viable. Projection displays are typically cost effective alternatives to direct-view displays such as LCDs, when large area and high brightness are desired. But the color quality and light distribution from prior projection displays are not sufficient for general lighting applications.

SUMMARY

Hence, for the reasons outlined above or other reasons, there is room for further improvement in lighting devices.

An example of apparatus as disclosed herein includes a memory, an electrically driven, controllable light source, a controllable beam steering reflector, a controllable, light output panel and a processor. The controllable beam steering reflector has a movable reflective surface optically aligned with the light source. The controllable, light output panel is optically coupled to the movable reflective surface. Programming code and an apparatus configuration file are stored in the memory. The apparatus configuration file includes an image display selection and a general illumination lighting distribution selection. The processor is coupled to the memory, the light source, the beam steering reflector and the light output panel. Upon execution of programming code stored in the memory, the processor is configured to output control signals to the light source, the beam steering reflector and the light output panel based on the apparatus configuration file to facilitate output of image light and output of general illumination lighting generated by the light source through the light output panel.

In some examples, an apparatus includes a memory, programming code stored in the memory, an electrically, controllable light source, a beam steering reflector, an output panel and a processor. The beam steering reflector has a movable reflective surface the orientation of which is electrically controllable. The output panel includes a control interface, a presentation region, and an addressable general illumination region having controllable states of opacity. The processor is coupled to the memory, the light source, the movable reflector, and the communication interface of the output panel. The processor, upon execution of the programming code stored in the memory, is configured to set light output parameters to generate light by the light source; direct the generated light toward the general illumination region of the output panel; and set the opacity state of the general illumination region according to the processed data.

Some examples of apparatus as disclosed herein include a one or more electrically, controllable light sources; a waveguide to which the one or more light sources are optically coupled; an array of controllable micro-projectors coupled to the waveguide; and an electrically, controllable output screen coupled to an output of the waveguide. The array of controllable micro-projectors includes a plurality of individually controllable micro-projectors, each of which individually controllable micro-projectors is controllable to aim output light that is output from predetermined locations of the output of the waveguide. The output screen includes a first set of controllable optics aligned with the waveguide that distribute light from the light sources according to general illumination distribution light parameters, the first set of controllable optics comprising a plurality of individually controllable optical elements; and a second set of controllable optics that process, according to image light parameters, the light aimed by the array of micro-projectors reflected from the predetermined locations of the waveguide reflective surface to output an image, the second set of controllable optics comprising a plurality of individually controllable optical elements.

Examples also include an apparatus including a first optical channel that provides image display light, the first optical channel including a color filter, DIS-State projection optics, and a diffuser screen, wherein the diffuser screen displays an image; a second optical channel that provides general illumination light to the premises, the second optical channel including an GI-State projection optics, and a general illumination part, wherein the general illumination part outputs general illumination to a premises in which the apparatus is located; a light source that emits light; and a controllable beam steering device coupled to the light source, and coupled to each of the first optical channel and the second optical channel, the controllable beam steering device configured to direct light emitted from the light source to either the first or the second optical channel in response to a control signal indicating to which of the first or second optical channel to steer the light emitted from the light source.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a lighting platform that utilizes a projection or waveguide arrangement to provide a lighting device that is configured to output images of, for example, virtual luminaires or other images, and provide general illumination light distributions that have been created in software. The described lighting devices, in some examples, offer the performance and aesthetic characteristics of a catalogue luminaire or whatever distribution and aesthetic appearance a designer may envision.

A software configurable lighting device, installed for example as a ceiling or wall-mounted panel, offers the capability to appear like and emulate a variety of different lighting devices. Emulation may include the appearance of the lighting device as installed in the wall or ceiling, possibly both when and when not providing lighting, as well as light output distribution, e.g. direction and/or beam shape. Multiple panels may be installed in a room. These panels may be networked together to form one display. In addition, this network of panels will allow industry standard and/or government standard, configurable lighting in the space of a premises in which the lighting is installed.

Image display may be the generation of a real-world scene, such as clouds, lighting device, objects, colored tiles, photographs, videos and the like, or computer-generated images, such as graphics and the like. In other examples, the image will be a representation of or include a representation (with surrounding other imagery) of a discernible lighting device. The lighting device image, for example, may depict a conventional fixture or type of actual luminaire.

Reference now is made in detail to the examples illustrated in the accompanying drawings and discussed below.

Figure 1:
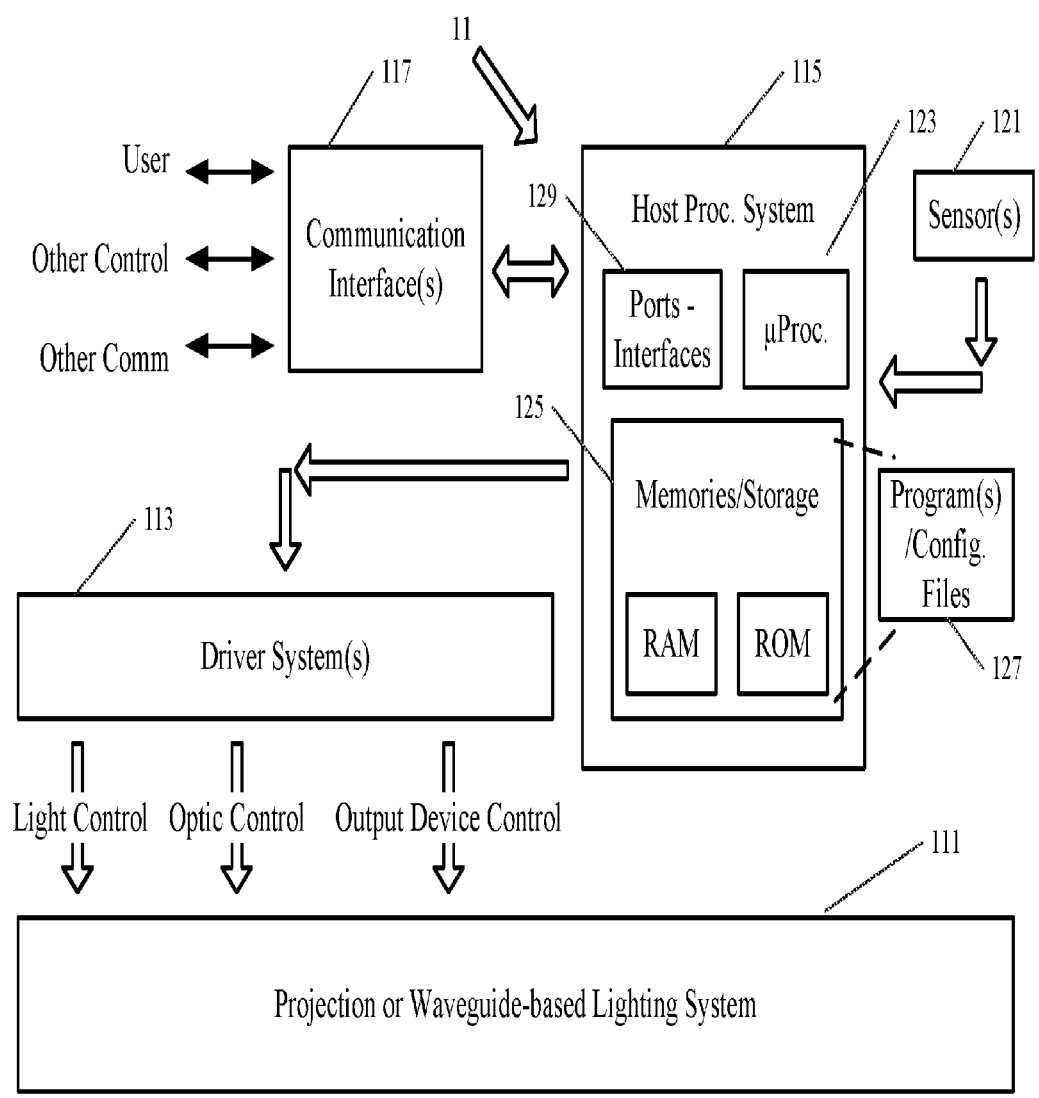
FIG. 1 is a high-level functional block diagram of a projection and/or waveguide based software configurable lighting apparatus.

FIG. 1 depicts an example of a lighting device 11, including high layer logic and communications elements, and a projection and/or waveguide-based software configurable lighting device 111 configured to simultaneously provide general illumination and display functionalities and one or more drivers (shown as a system) 113. As discussed in more detail later, the system 111 may utilize projection and/or waveguide technologies.

As shown in FIG. 1, the lighting fixture 11 includes the software configurable lighting system 111, a driver system 113, a host processing system 115, and one or more communication interface(s) 117. Apparatuses implementing functions like those of the software configurable lighting system 111 may take other forms. In some examples, some components attributed to the lighting device 11 may be separated from the software configurable lighting system 111. For example, an apparatus may have all of the above hardware components on a single hardware device as shown or in different somewhat separate units. In a particular example, one set of the hardware components may be separated from software configurable lighting system 111, such as the host processing system 115 and may run several systems, such as the driver system 113 from a remote location. Also, one set of intelligent components, such as the microprocessor 123, may control/drive some number of driver systems 113 and/or software configurable lighting systems 111.

One or more sensors 121 may also be coupled to the host processor 115 to provide signals indicating premises-related environmental conditions, such as natural lighting conditions, room occupancy indications, indoor temperature, humidity or the like, status updates, operating conditions (e.g., component temperatures, power usage, ON time duration, or the like), indicators of external environmental conditions, such as rain, outdoor temperature, or the like, as well as other types of sensors relevant to industrial and residential lighting environments.

The software configurable lighting system 111 includes controllable light source(s), movable reflector(s) and a controllable output panel. At this time it may be appropriate to explain some of the terms that will be frequently referenced throughout the discussion of examples. For example, the light sources in the controllable system are arranged to provide light toward an optical system, such as a movable reflector, a waveguide or projection optics (all of which are discussed in more detail with reference to other examples) within the software configurable lighting system 111. The light source is electrically controllable with respect to one or more light output parameters comprising light intensity or light color characteristic. In some examples with multiple light sources, each the light source is individually controllable in response to control signals from the driver system 113.

For example, a processor 123 by accessing programming 127 in the memory 125 controls operation of the driver system 113 and other operations of the lighting device 11. In the examples, the processor 123 processes data retrieved from the memory 123 and/or other data storage, and responds to light output parameters in the retrieved data to control the light generation and distribution system 111. The light output parameters may include light intensity, light color characteristics, spatial modulation, spatial distribution and the like.

The host processing system 115 provides the high level logic or "brain" of the device 11. In the example, the host processing system 115 includes data storage/memories 125, such as a random access memory and/or a read-only memory, as well as programs 127 stored in one or more of the data storage/memories 125. The host processing system 115 also includes a central processing unit (CPU), shown by way of example as a microprocessor (µP) 123, although other processor hardware may serve as the CPU.

The host processing system 115 is coupled to the communication interface(s) 117. In the example, the communication interface(s) 117 offer a user interface function or communication with hardware elements providing a user interface for the device 11. The communication interface(s) 117 may communicate with other control elements, for example, a host computer of a building and control automation system (BCS). The communication interface(s) 117 may also support device communication with a variety of other systems of other parties, e.g. the device manufacturer for maintenance or an on-line server for downloading of virtual luminaire configuration data.

The host processing system 115 also is coupled to the driver system 113. The driver system 113. The driver system, or driver, 113 is coupled to the software configurable lighting system 111, which is a controllable light generation and image display system (e.g., a "controllable system") 111 to control the light generation by the controllable system 111. The driver 113 also controls the distribution of the generated light within the controllable system 111 as well as the output of the generated light as either an image display or as general illumination lighting. The host processing system 115 and the driver system 113 provide a number of control functions for controlling operation of the lighting device 11.

Figure 2:
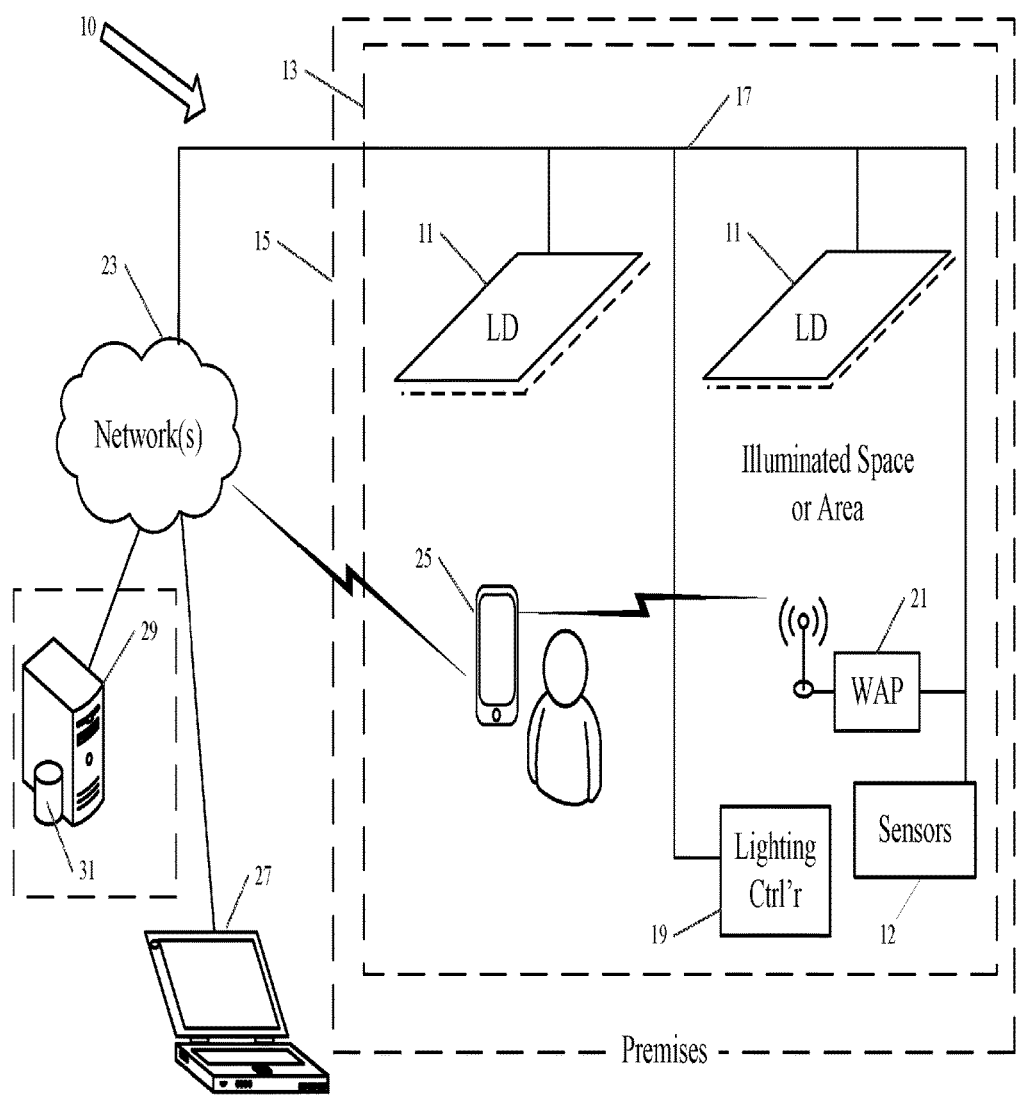
FIG. 2 is a high-level networking block diagram illustrating an example of a lighting system, such as that shown in FIG. 1, in a space of a premises.

FIG. 2 illustrates a system 10 for providing configuration or setting information to a projection-based or waveguide-based software configurable lighting device (LD) 11, e.g. based on a user selection. The projection-based or waveguide-based software configurable lighting device 11, as well as some other elements of system 10, are installed within a space or area 13 to be illuminated at a premises 15. The premises 15 may be any location or locations serviced for lighting and other purposes by such system of the type described herein. Most of the examples discussed below focus on building installations, for convenience, although the system may be readily adapted to outdoor lighting. Hence, the example of system 10 provides lighting, imagery and possibly other services in a number of service areas in or associated with a building, such as various rooms, hallways, corridors or storage areas of a building and an outdoor area associated with a building. Any building forming or at the premises, for example, may be an individual or multi-resident dwelling or may provide space for one or more enterprises and/or any combination of residential and enterprise facilities.

The system elements, in a system like system 10 of FIG. 2, may include any number of projection-based or waveguide-based software configurable lighting devices 11 as well as one or more lighting controllers 19. Lighting controller 19 may be configured to provide control of lighting related operations (e.g., ON/OFF, intensity, brightness, image control signals and general illumination control signals) of lighting device 11. Alternatively, or in addition, lighting controller 19 may be configured to provide control of the software configurable aspects of lighting device 11, as described in greater detail below. That is, lighting controller 19 may take the form of a processor, such as 123 of FIG. 1, a switch, a dimmer, or a smart control panel including a user interface depending on the functions to be controlled through device 19. The lighting system elements may also include one or more sensors 12 used to control lighting functions, such as occupancy sensors, ambient light sensors and light or temperature feedback sensors that detect conditions of or produced by one or more of the lighting devices. If provided, the sensors 12 may be implemented in intelligent standalone system elements, or the sensors 12 may be incorporated in one of the other system elements, such as lighting device 11 and lighting controller 19.

The on-premises system elements 11, 12, 19, in a system like system 10 of FIG. 2, are coupled to and communicate via a data network 17 at the premises 15. The data network 17 in the example also includes a wireless access point (WAP) 21 to support communications of wireless equipment at the premises. For example, the WAP 21 and network 17 may enable a user terminal for a user to control operations of lighting device 11. Such a user terminal is depicted in FIG. 2, for example, as a mobile device 25 within premises 15, although any appropriate user terminal may be utilized. However, the ability to control operations of lighting device 11 may not be limited to a user terminal accessing data network 17 via WAP 21 within premises 15. Alternatively, or in addition, a user terminal such as laptop 27 located outside premises 15, for example, may provide the ability to control operations of lighting device 11 via one or more other networks 23 and the on-premises network 17. Network(s) 23 includes, for example, a local area network (LAN), a metropolitan area network (MAN), a wide area network (WAN) or some other private or public network, such as the Internet.

For lighting operations, the system elements for a given service area (11, 12 and/or 19) are coupled together for network communication with each other through data communication media to form a portion of a physical data communication network. Similar elements in other service areas of the premises are coupled together for network communication with each other through data communication media to form one or more other portions of the physical data communication network at the premises 15. The various portions of the network in the service areas in turn are coupled together to form a data communication network at the premises, for example to form a LAN or the like, as generally represented by network 17 in FIG. 1. Such data communication media may be wired and/or wireless, e.g. cable or fiber Ethernet, Wi-Fi, Bluetooth, or cellular short range mesh. In many installations, there may be one overall data communication network 17 at the premises. However, for larger premises and/or premises that may actually encompass somewhat separate physical locations, the premises-wide network 17 may actually be built of somewhat separate but interconnected physical networks utilizing similar or different data communication media.

System 10 also includes server 29 and database 31 accessible to a processor of server 29. Although FIG. 2 depicts server 29 as located outside premises 15 and accessible via network(s) 23, this is only for simplicity and no such requirement exists. Similarly, although FIG. 2 depicts database 31 as physically proximate server 29, this is only for simplicity and no such requirement exists. Instead, database 31 may be located physically disparate or otherwise separated from server 29 and logically accessible by server 29, for example via network 17.

Database 31 may be a collection of configuration information files for use in conjunction with software configurable lighting device 11. For example, each configuration information file within database 31 includes an image file and a general illumination distribution file. In one example, a selected configuration information file from among the collection of configuration information files is loaded into a memory of projection-based or waveguide-based software configurable lighting device 11, and software configurable lighting device 11 is configured to set lighting device output parameters in accordance with the selected configuration information file. The light device output parameters include, for example, light intensity, light color characteristic spatial modulation, waveguide specific lighting parameters and projection-based lighting parameters, such as beam steering reflector settings or optical channel selection settings. In this one example, the included image is a representation of a luminaire, a graphic scene, a picture scene, real imagery, video or the like, and the general illumination distribution setting configures lighting device 11 to emit light for general illumination having a light distribution corresponding to a light distribution of an output of the represented luminaire. That is, the selected configuration information file enables lighting device 11 to achieve a specific appearance and performance, e.g. lighting device 11 appears to be the represented luminaire and performs like the represented luminaire.

It should also be noted that, while various examples describe loading a single configuration information file onto lighting device 11, this is only for simplicity. Lighting device 11 may receive one, two or more configuration information files and each received file may be stored within lighting device 11. In such a situation, lighting device 11 may, at various times, operate in accordance with configuration information in any one of multiple files, e.g. operate in accordance with first configuration information during daylight hours and in accordance with second configuration information during nighttime hours or in accordance with different file selections from a user operator at different times. Alternatively, lighting device 11 may only store a single configuration information file.

The lighting device 11 may have different configurations, and may be implemented using different and/or similar components. The following discussion provides examples of apparatuses usable as a lighting device in the system 10 of FIG. 2.

Figure 3A:
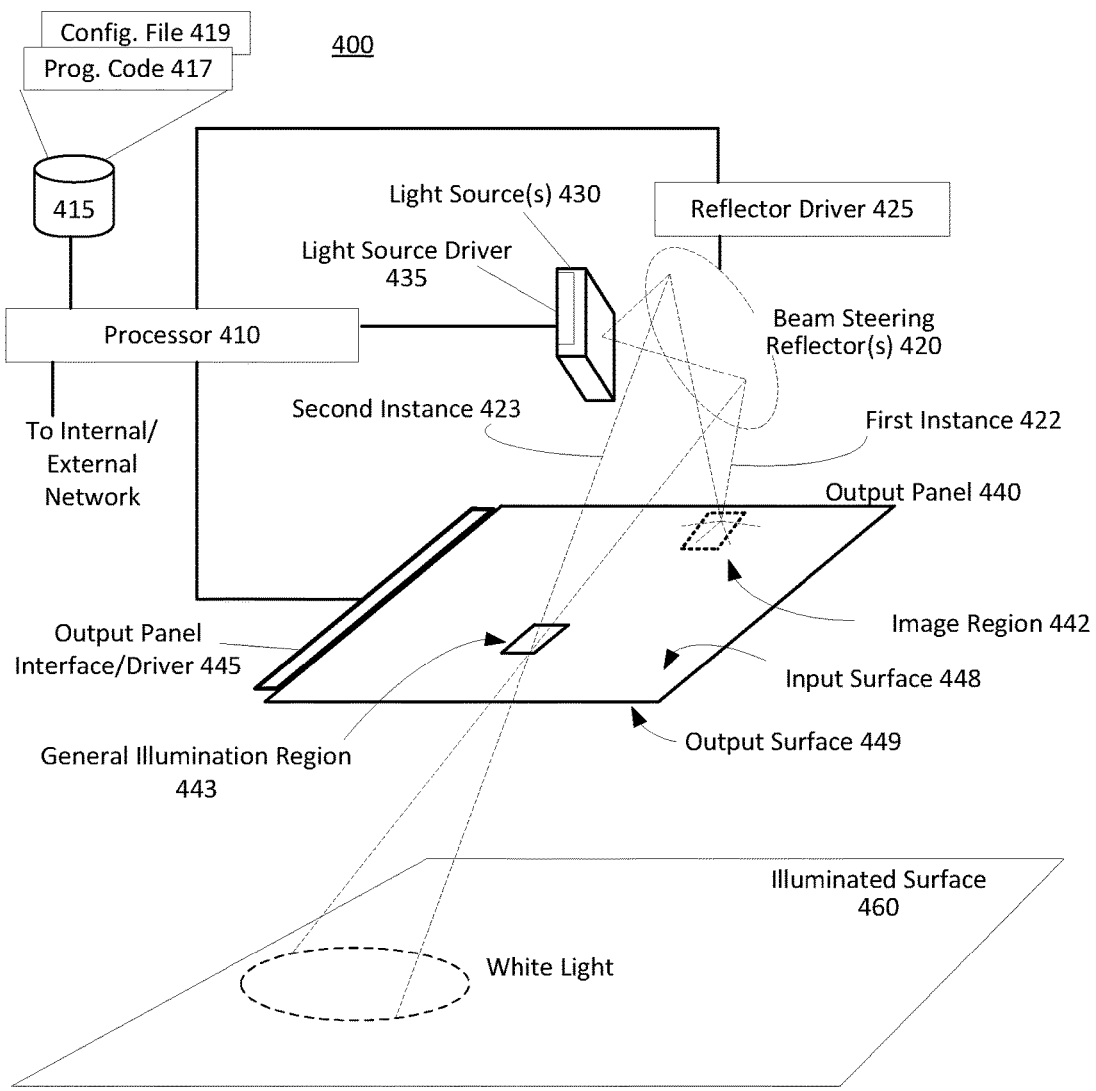
FIG. 3A is a somewhat more detailed illustration of an example of a projection and/or waveguide based software configurable lighting device including a high-level illustration of components of the lighting device.

FIG. 3A is a detailed illustration of an example of a projection-based software configurable lighting device 400 that may be used as a lighting device 11 of FIG. 2. The lighting device 400 includes a processor 410, memory 415, programming code 417, an apparatus configuration file 419 stored in the memory 415, an electrically driven, controllable light source 430, a movable reflector 420, and an output panel 440.

The apparatus configuration file 419 includes, in some examples, an image display selection and a general illumination lighting distribution selection. The image display selection includes all of the information needed for the presentation of an image at the output put surface 449. For example, the image display selection information may include individual pixels values (including intensity, color and the like) for the image to be presented. Alternatively, the image display selection information may include image display parameters that are used by the processor 410 to calculate image display control signals. For example, the image display parameters may be used as inputs to an image display function that calculates image settings that the processor 410 uses to generate image display control signals. In another example, the processor 410 may output the parameters as image display control signals.

The general illumination lighting distribution selection may include information, such as light source(s) 430 settings, beam steering reflector(s) 420 settings, general illumination region 443 settings and other information, that the processor 410 may use to generate control signals for providing general illumination.

The processor 410 is coupled to the memory 415. The processor 401 controls the light source 430 via the light source driver 435, controls the movable reflector 420 via the reflector driver 425, and controls the light output panel 440 via the output panel interface/driver 445. The processor 410, upon execution of programming code 417 stored in the memory 415, is configured to output control signals to the light source 430, the movable reflector 420 and the light output panel 440 via the respective drivers 425, 435 and 445 based on the apparatus configuration file 419 to facilitate the output of light generated by the light source through the light output panel 440. For example, the processor 410 accesses the memory 415 and retrieves the apparatus configuration file 419 information including the image display selection and general illumination lighting distribution selection. The processor 410 using image parameters from the image display selection information applies a function, such as a chaotic function, that generates image pixel values. The generated image pixel values are used by the processor 410 to generate control signals that are applied to the respective drivers 425, 435 and 445. Similarly, the processor 410 retrieves the general illumination lighting distribution selection and generates general illumination control signals based on the general illumination lighting distribution selection.

The light source 430 is coupled to the processor 410 via a light source driver 435. The light source 430 is responsive to a voltage and/or current (i.e., "signals") received from the light source driver 435. The light source driver 435 is coupled to the processor 410 and the light source 430. Light source 430 may include light emitters that generate or emit light in response to control signals, which include, for example, planar light emitting diodes (LEDs) of different colors; a micro LED; organic LEDs of different colors; an organic LED display; LEDs of different colors on gallium nitride (GaN) substrates; nanowire or nanorod LEDs of different colors; photo pumped quantum dot (QD) LEDs of different colors; plasmonic LEDs of different colors; a plasma source; laser diodes of different colors; micro LEDs of different colors; resonant-cavity (RC) LEDs of different colors; Super luminescent Diodes (SLD) of different colors, and photonic crystal LEDs of different colors.

The light source 430 may be a single light generator/emitter, or may be multiple light generator/emitter, that is optically coupled to at least one movable reflector 420. The light source 430 is coupled to a light source driver 435 that has circuitry responsive to control signals from the processor 410. In an example, the lighting device 400 uses a light source similar to a projection television system, e.g. with a modulated light generation device or system, as a light source 430 and light source driver 435 that is optically aligned with the movable reflector 420. In other examples, different light sources are used. Multiple passive optics like lenses, prisms, light guides may be used to optically couple the light source to the reflector.

The movable reflector 420 includes a reflective surface optically aligned with the light source 430. The movable reflector 420 is coupled to a reflector driver 425 that has circuitry responsive to control signals from the processor 410. The movable reflector 420 may be based on microelectromechanical systems (MEMS), for example a digital micro-mirror device (DMD) or an analog tip/tilt/piston mirror, that distributes light modulated with respect to intensity and color characteristic across the surface of the output panel 440. In the projection example, the output panel 440 may include image presentation regions and general illumination regions that are formed on a surface of the output panel. The movable reflector 420, in response to control signals provided by processor 410, directs image-related light from the light source 430 to each image region 442, and, in response to other control signals, directs light for general illumination of an area, such as illuminated surface 460, to general illumination regions 443 to provide a selected general illumination distribution. The light sources 430 may also be controlled by the processor 410. For example, the light sources 430 may be modulated in cooperation with the movable reflector 420 to provide the correct intensity and color characteristics for the image and illumination regions. The illuminated surface 460 may be a desktop, a floor, countertop, wall or a combination of surfaces.

The light output panel 440 is optically coupled to the movable reflector. The controllable, light output panel 440 may be a passive patterned diffuser having a pattern of diffuse portions (i.e., image region) for image display, and transparent portions (i.e., general illumination regions) for lighting transparent regions that enable general illumination light to be output from the output panel. In other examples, the general illumination regions 443 may be optical elements like micro-lenses, prisms, or the like to provide different light distributions. In another example, the whole light output panel 440 may be a screen formed from nanophosphor materials which act as color dependent diffusers. For some wavelengths of light, such as ultra-violet light or small bands within the visible range, the nanophosphor materials will diffuse light. The light source can be modulated for those specific wavelengths to create the image. For other wavelengths, the nanophosphor materials act as transparent windows letting the light travel straight through the output panel 440. The light source for these wavelengths may be modulated to provide a color temperature and intensity for the illumination regions according to the general illumination distribution selection. To achieve the selected color temperature and intensity, the light source 430 may, for example, contain multiple color light sources designed and modulated accordingly.

The image-related light mentioned above is light that when each image region 440 is viewed in the aggregate presents an image on the output surface 449 of the output panel 440. For example, the image-related light may be light of a specific color, such as red, green, blue, amber, white, that is determined to be output to form an image on the output panel based on the selected image. Light for general illumination is typically white light having a brightness and color temperature that is determined based on the selected general illumination distribution.

The light output panel 440 includes image regions 442 and general illumination regions 443. One of each region 442, 443 is shown for ease of illustration and explanation; however, in actual implementation, hundreds to millions of regions 442, 443 may be present. The image region 442 is, for example, a first set of addressable distributed regions of the output panel 440 responsive to image control signals output by the processor 410. The image regions 442 are controlled based on the image selection of the configuration file 419. The general illumination region 443 is a second set of addressable distributed regions responsive to general lighting control signals output by the processor 410.

In an operational example, the processor 410 by executing the programming code 417 and using the configuration file 419 coordinates control of the light source 430, the movable reflector 420 and output panel 440. For example, the configuration file 419 includes information related to the image selection and the general illumination distribution selection. The processor 410 determines based on the respective image and the general illumination distribution selections, the characteristics of the light to be generated by the light source 430, and at which specific image region 442 or general illumination region 443 the generated light is to be directed. It may now be appropriate to describe an operational example of the foregoing apparatus with reference to FIG. 3B.

Figure 3B:
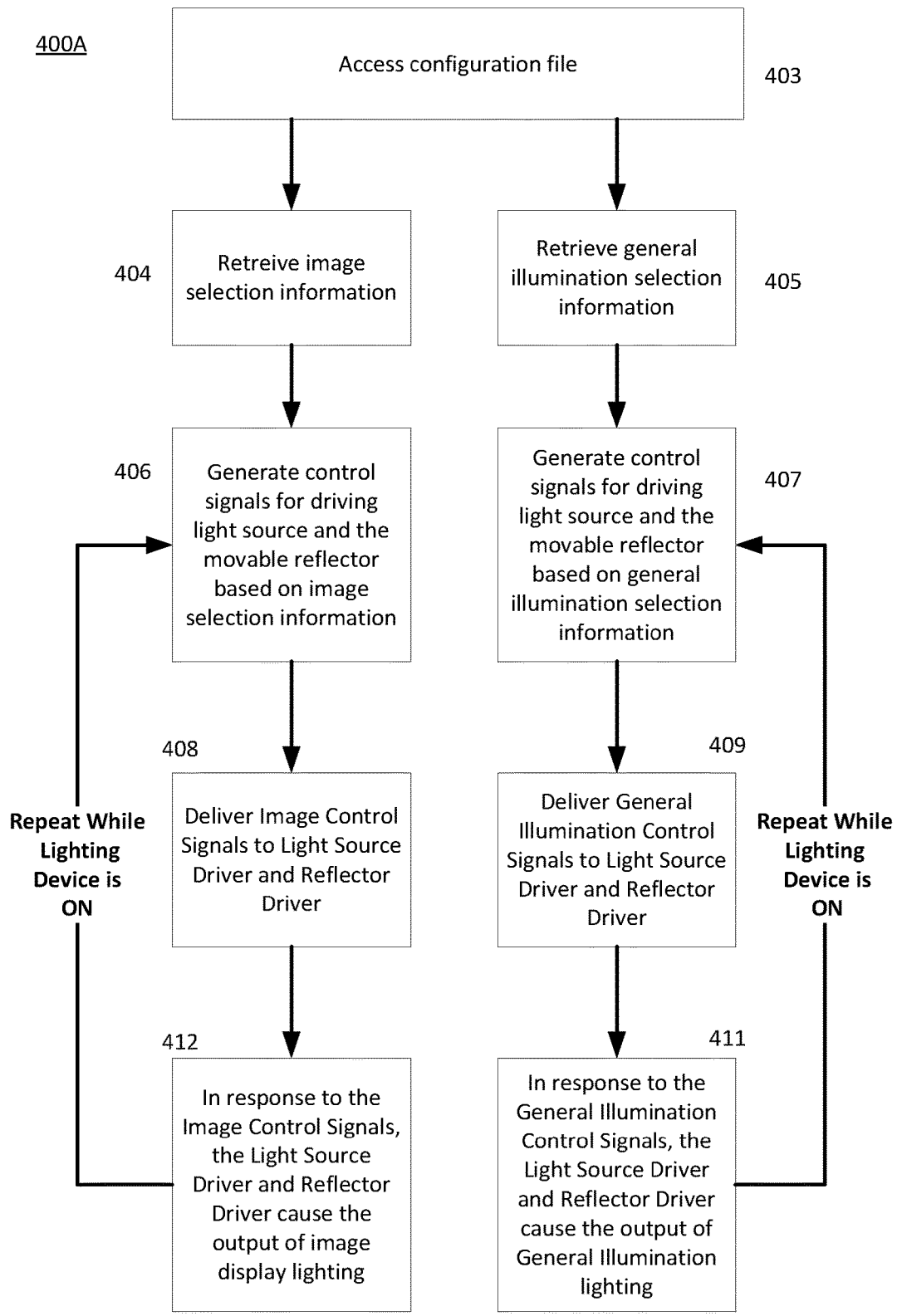
FIG. 3B is a flowchart of a process utilizing a projection approach for a software configurable lighting device, such as that shown in FIG. 3A.

FIG. 3B is a flowchart of a process utilizing a projection approach for a software configurable lighting device, such as that shown in FIG. 3A. In the operational example, the processor 410 executes programming code 417 stored in the memory to control the light source 430, the movable reflector 420, and the output panel 420. During a first time period, the processor 410 accesses the configuration file 419 in memory 415 (Step 403). The processor 410, at Step 404, retrieves the image selection information. The processor 410 determines from the image selection information in the configuration file 419 that the light source 430 is to be driven, in during the first time period, to provide light for presenting a portion of an image. For example, the processor 410 determines light parameters, such as intensity, color and a predetermined ON-OFF duration, such as, for example, a duration in the micro-second range to the millisecond range depending on the image refresh rate, resolution, source brightness and/or other parameters, other timing information, such as switching between image light generation to general illumination light generation and vice versa, from the image selection information in the received configuration file. The image selection in the received configuration file may include additional data, such as an address of the image region 442 toward which the generated light is to be directed. In response to the determinations of processor 410 made based on the received configuration file, the processor 410 generates control signals (Step 406) for causing the light source driver 435 to cause the light source 430 to generate light having the stored light parameters. Based on the determination, the processor 410 controls the light source 430 by delivering control signals to the light source driver 435 (Step 408). In response to the received control signals, the circuitry of the light source driver 435 drives the light source 430 to generate/emit light for presenting the portion of the image on the output panel 440. The processor 410 sends, simultaneously or substantially simultaneously, control signals based on the general illumination selection information in the received configuration file to the reflector driver 425 for driving the beam steering reflector 420 to provide general illumination (Step 409).

The processor 410 provides control signals with the address information to the reflector driver 425. The reflector driver 425 interprets the received control signals, and in response to the control signals, the reflector driver 425 generates signals that cause the beam steering reflector 420 to direct the generated image light to the addressed image region 442. For example, in response to the image control signal received from the processor 410 at the first time period, the beam steering reflector 420 is positioned such that a movable, reflective surface of the beam steering reflector 420 directs light generated by the light source to the image regions 442 of the controllable light output panel 440 (Step 412).

Similarly, during a second time period, the processor 410, at Step 405, retrieves from the configuration file accessed at Step 403, the general illumination selection information. The processor 410 determines from the general illumination distribution selection information in the received configuration file that the light source 430 is to be driven, in a second instance, to provide light for providing general illumination. The processor 410 determines light parameters, which in the case of general illumination is, for example, white colored light with maximum intensity and a predetermined duration, such as in the sub-millisecond range to avoid flicker or other adverse effect, from the general illumination distribution selection information in the received configuration file, and, in response, generates control signals (Step 407) for causing the light source driver 435 to cause the light source 430 to generate light having the general illumination distribution light parameters. Based on the determination, the processor 410 controls the light source 430 by delivering (Step 409) control signals to the light source driver 435. In response to the received control signals, the circuitry of the light source driver 435 drives the light source 430 to generate/emit light for providing the general illumination through a general illumination region of the output panel 440. The processor 410 sends, simultaneously or substantially simultaneously, control signals based on the general illumination distribution selection in the received configuration file to the reflector driver 425 for driving the movable reflector 420.

For example, the general illumination distribution selection in the received configuration file may include data, such as an address of the general illumination region 443 that the generated light, in this first instance, is to be directed towards. The processor 410 provides control signals with the address information to the reflector driver 425. The reflector driver 425 interprets the received control signals, and in response to the control signals, the reflector driver 425 generates signals that cause the movable reflector 420 to direct the generated general illumination light to the addressed general illumination region 443. The processor 410 controls the movable reflector 420 by sending general illumination control signals to the reflector driver 425. In response to the general illumination control signals, the movable reflector 420 is positioned such that a movable reflective surface of the beam steering reflector 420 directs light generated by the light source 430 to the general illumination regions 443 of the controllable light output panel 440 (Step 411) for output as general illumination lighting.

The above steps 406-409, 412 and 411 of process 400A may be repeated while the lighting device is powered ON. For example, the steps may be repeated periodically or in response to a particular event (such as being provided with a new image for presentation, or the like). While the steps 404-408 and 412, and 405-409 and 411 are shown in parallel, in an alternative example, is also envisioned that the steps 403-409, 412 and 411 may be performed serially.

Of course, variations to the processes 400A are also envisioned. For example, the image selection information and the general illumination selection information may contain pre-generated control signals that may be parsed from the respective selection information and simply delivered, respectively, to the light source driver 435 and reflector driver 425, thereby, omitting steps 406 and 407.

While the lighting device 400 configuration is shown configured with one light source and one movable reflector other configurations are also envisioned. The light source 430, for example, may be a number of light sources. The light source 430 may comprise a number of light emitters having different colors such as red (R), green (G), blue (B), white (W), amber (A) or the like. The light source driver 435 may also be configured to drive the respective RGBWA light emitters to provide colored light to the respective image regions 442 or white light to the respective general illumination regions 443.

In an example, the light source 430 may include a first electrically driven, controllable light source that outputs light over a range of brightness levels, and a second electrically driven, controllable light source that outputs light having one or more discrete brightness levels. In this two light source example, the second light source has only two states: an ON state that outputs light having a first brightness level, and an OFF state that outputs light having a second brightness level. The first light source is intended to provide light for producing an image on the output panel 440, and the second light source is intended to provide light for producing general illumination output from the output panel 440. In this example, there is only one movable reflector 420 that is optically aligned with each of the respective first and second light sources, and is controlled to by the processor 410 to reflect light from each of the first and second light sources.

In another example using the first and second light sources, which are configured to provide image light and general illumination light, respectively, a first and second movable reflector are also provided. The first movable reflector has a reflective surface that is optically aligned with the first light source. The first movable reflector is configured to steer light generated by the light source for presentation an image to an image region 442 of the first set of addressable distributed image regions of the light output panel 440. Similarly, the second movable reflector has a reflective surface that is optically aligned with the second light source. The second movable reflective surface is configured to steer light generated by the light source for providing general illumination to a general illumination region 443 of the second set of addressable distributed general illumination regions of the light output panel 440.

Figure 4A:
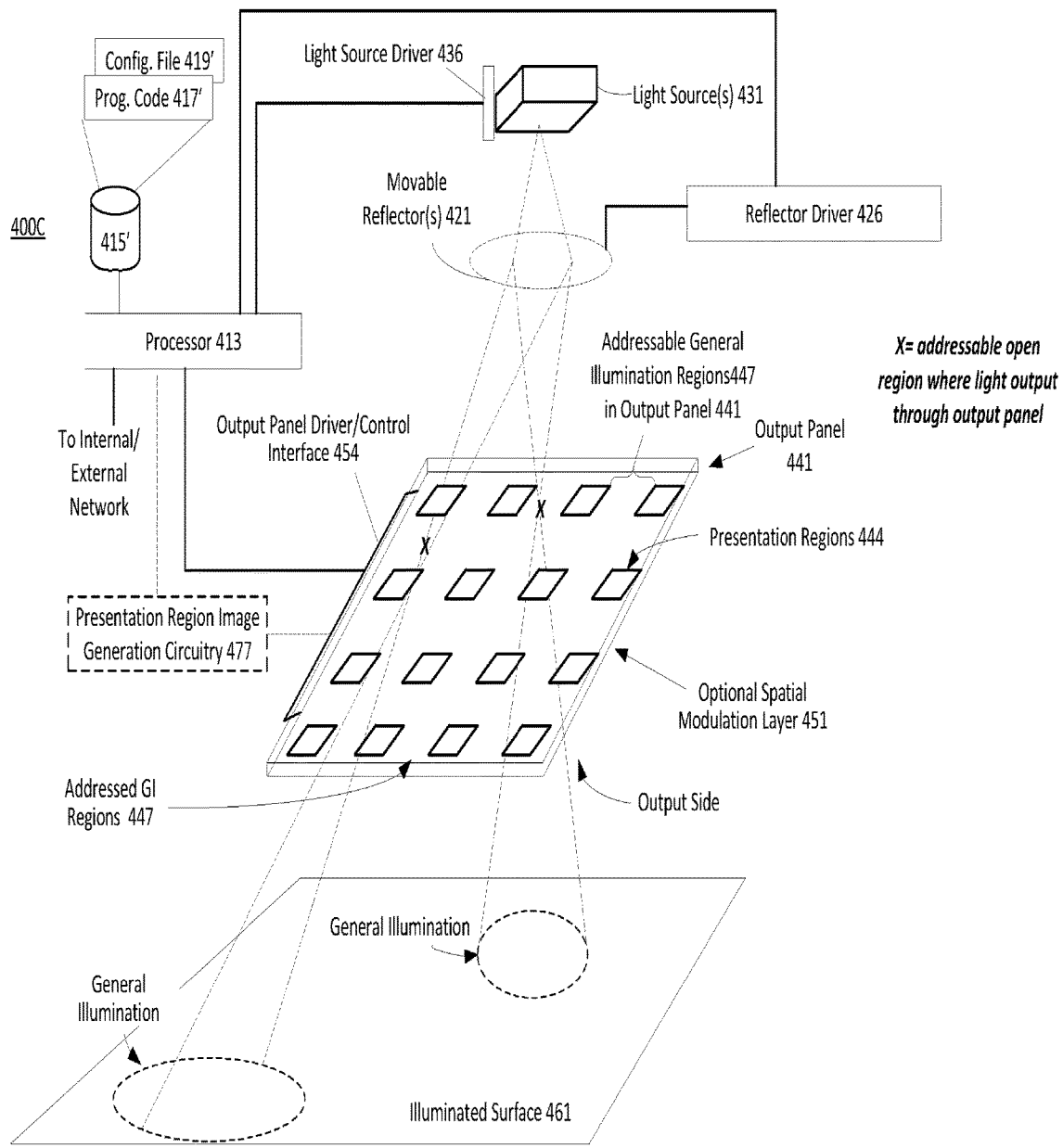
FIG. 4A is another example of a somewhat more detailed illustration of an example of a projection and/or waveguide based software configurable lighting device including a high-level illustration of components of the lighting device.

FIG. 4A is another example of a somewhat more detailed illustration of an example of a software configurable lighting device including a high-level illustration of components of the lighting device. In addition to controlling the light source 431 and the movable reflector 421, the processor 413 also controls image presentation devices of the output panel 441.

The structural features of processor 413, movable reflector 421 including reflector driver 426 as well as memory 41 of FIG. 4A are substantially the same as the corresponding elements (e.g., processor 410, light source 430 including light source driver 435, movable reflector 420 including reflector driver 425) 5 in FIG. 3A. Therefore, a detailed discussion of the similar structural features and interconnections will not be discussed for the sake of brevity. While these elements are similar to previously described elements, other elements differ with respect to structure as well as function.

For example, the light source 431 is a high brightness light emitter, such as a white light emitting diode (LED) or the like. The light source 431, in the illustrated example, is used to provide general illumination lighting on the illuminated surface 461. The illuminated surface 461 may be a desktop, a floor, countertop, wall or a combination of surfaces. The output panel 441 may be an organic light emitting diode (OLED), electroluminescent display (ELD), or plasma-based flat panel display with general illumination regions that permit general illumination light to pass through. As shown in FIG. 4A, the output panel 441 includes a number of presentation regions 444 and a number of addressed general illumination regions 447. The presentation regions 444 are capable of generating an image without need for light from the light source 431, and the addressed general illumination (GI) regions 447 pass light from the light source 431 to the illuminated surface 461. For example, presentation region image generation circuitry 477 may be coupled to the processor 413 and the output panel driver/control interface 454. The processor 413, for example, when coupled to the presentation region image generation circuitry 454 may deliver the image display selection information directly to the presentation region image generation circuitry 477. In response, the presentation region image generation circuitry 477 generates control signals that cause the presentation of the selected image display at the output side of the output panel 441. As a result of the output panel 441 configuration, the processor 413 does not generate any image control signals for controlling reflector driver 426 for presenting an image. In some instances, the configuration file 419' does not include image information that the processor 413 is able to interpret.

Figure 4B:
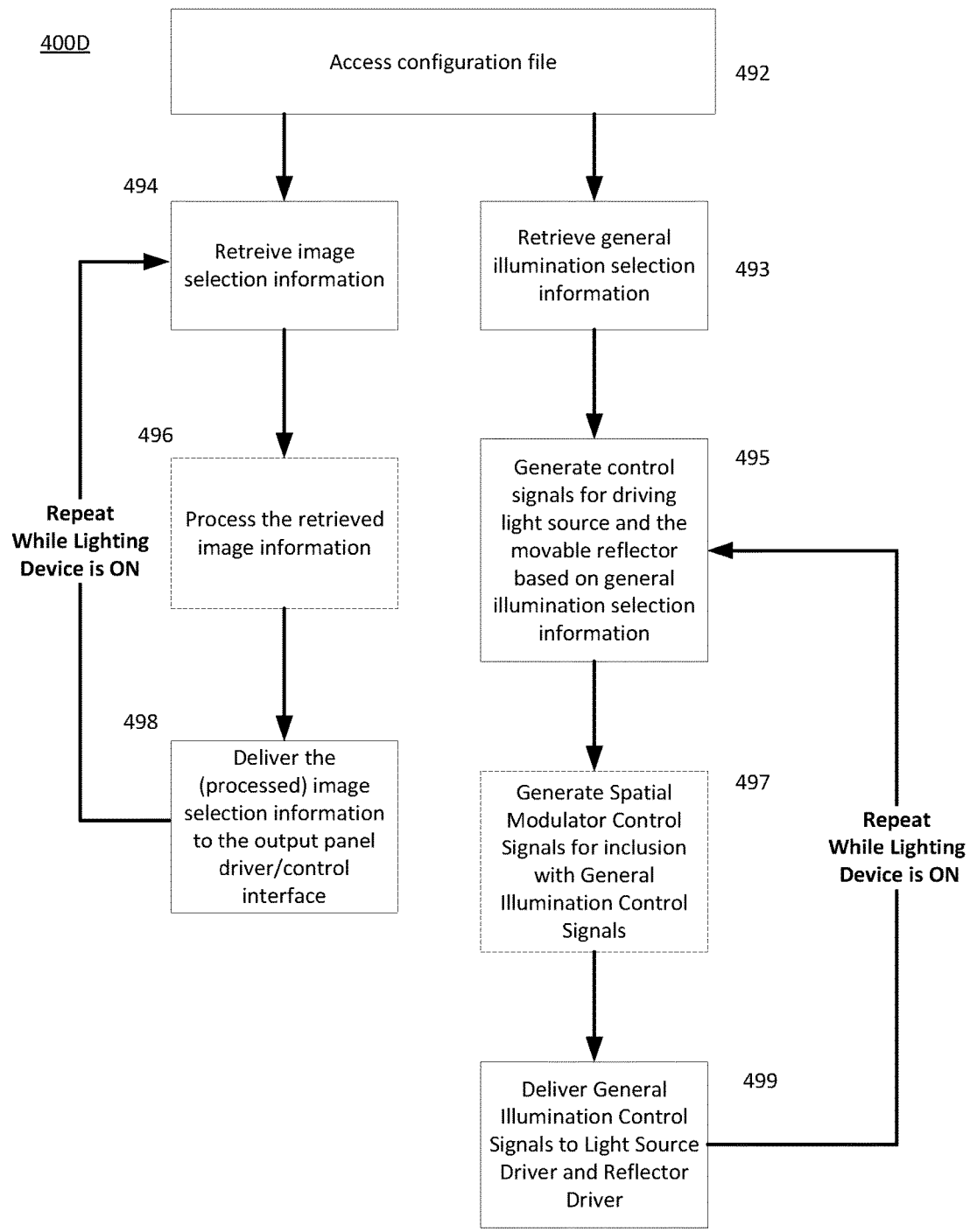
FIG. 4B is a flowchart of a process utilizing a projection approach for a projection-based software configurable lighting device, such as that shown in FIG. 4A.

In an operational example, a process 400D for utilizing the lighting device 400C will be described with reference to FIG. 4B. FIG. 4B is a flowchart of a process utilizing a projection approach for a software configurable lighting device, such as that shown in FIG. 4A. The processor 413 accesses the configuration file 419' (Step 492). The processor 413 retrieves the image information of the configuration file 419' (Step 494). The retrieved image selection information may be delivered by the processor 413 to the output panel driver/control interface 447 without any further processing (Step 498). In response to the received image selection information, the output panel driver/control interface 447 interprets the received image information, and provides the image information to the respective presentation regions 444 that will output the image from the output panel 441.

Alternatively, the processor 413 may retrieve the image information from the configuration file 419' (Step 494), process the image information (Step 496) and deliver the processed image information to the output panel driver/control interface 454 (Step 498). In either example, the output panel driver/control interface 454 causes an image or portions thereof to be presented on the respective presentation regions 444.

Simultaneously, or substantially simultaneously, the processor 441 retrieves from the configuration file 419' information related to the general illumination distribution selection (Step 493). The general illumination distribution selection information may include general illumination light characteristic information, such as light intensity, color temperature, duration or the like, as well as an address of an general illumination region, or an addressable aperture region 447, to which the generated general illumination light is to be directed. Based on the obtained general illumination information, the processor 441 generates (Step 495) control signals that coordinate the generation of the general illumination light by the light source 431 and the steering of the moveable reflector 421 to deliver the general illumination light having the proper light parameters/characteristics to the addressed aperture region 447. The generated control signals are delivered by the processor 413 (Step 499) to the light source driver 436 and the reflector driver 426. In the illustrated example, the X indicates addressed general illumination regions 447 through which the general illumination on illuminated surface 461 passed.

The above steps 494, 496 and 498 and steps 495-499 of process 400D may be repeated while the lighting device is powered ON. For example, the steps may be repeated periodically or in response to a particular event (such as being provided with a new image for presentation, or the like). While the steps 494-498 and 493-499 are shown in parallel, in an alternative example, is also envisioned that the steps 494-499 may be performed serially.

Of course, variations to the processes 400D are also envisioned. For example, the image selection information and the general illumination selection information may contain pre-generated control signals that may be parsed from the respective selection information and simply delivered, respectively, to the light source driver 436 and reflector driver 426, thereby, omitting steps 495 and 497.

Returning to FIG. 4A, the lighting device 400C may include additional elements. For example, the output panel 441 may include an optional spatial modulation layer 451. The optional spatial modulation layer 451 may include spatial modulators arranged as a matrix of pixels in which a pixel spatial light modulator is optically coupled to process general illumination light from one or more general illumination regions 447. Each pixel spatial light modulator, for example, is configured to be electrically controllable with respect to at least one of beam shape or beam distribution (i.e. steering) of general illumination light from the light source 431. In some of the examples, the individual pixel spatial modulators in the spatial modulator array are also individually controllable in response to control signals from the processor 441 as output panel control signals. For example, as shown in FIG. 4B, the processor 441 may generate the output control panel signals with spatial modulator signals that configure the respective spatial modulator corresponding to the addressed general illumination regions according to the general illumination distribution selection. The output panel control signals are provided to the output panel driver/control interface 447 by the processor 441. Examples of devices that may be used in the optional spatial modulation layer 451 may include slow switching speed technologies such as electro-wetting devices, liquid crystal polarization gratings, microlens devices, or the like.

The general illumination light distribution, also referred to as angular distribution, spatial modulation, and/or light distribution, refers to general illumination light as well as spatial characteristic(s) of the output of light from a lighting device. Spatial distribution of the general illumination is influenced by different control parameters related to the manner in which generated light leaves the spatial modulator aligned with the respective aperture region 447, such as the angle (also referred to as beam steering), a beam shape, time period/duration, and the like. The generated light may also take the form of light for general illumination, such as task lighting, area lighting, focal point lighting (e.g., illuminating a painting on a wall or a niche), mood lighting, and the like, that illuminates illuminated surface 461.

In addition to the projection-related examples of FIGS. 3A-4B, other examples having a reduced height and/or a more compact form factor are also envisioned as lighting devices 11 of FIG. 2. For example, FIG. 5A is another example of a waveguide-based software configurable lighting device including a high-level illustration of components of the lighting device that has a more compact form factor than the previous examples.

The lighting device 500 includes a processor 510, a memory 515, a number of light sources 520, an array of micro projectors 525, a waveguide 540, and an output screen 550. The lighting device also includes a memory, an array of micro-projectors 525. The lighting device 500 provides general illumination to an illuminated surface 560, such as a desktop, floor countertop, wall or the like.

The processor 510 is coupled to a memory 515 storing programming code 517' and a configuration file 519'. The programming code 517' when executed by the processor 510 configures the processor 510 to perform functions for operating the software configurable lighting device 500. The light sources 520 may be one or more LEDs or lasers that have high dynamic brightness range. The one or more light sources 520 may be individually, electrically controllable by the processor 510.

Figure 5A:
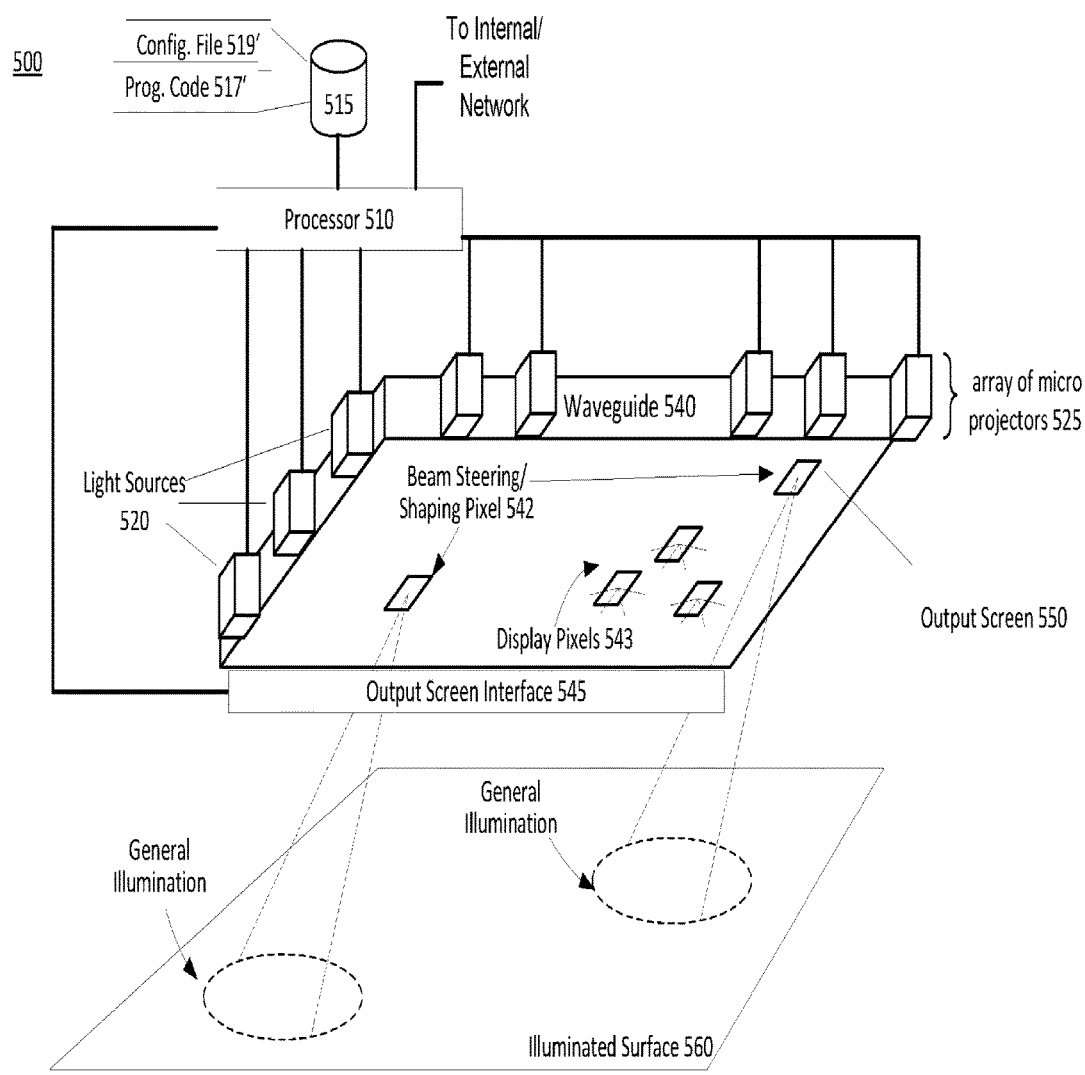
FIG. 5A is another example of a waveguide based software configurable lighting device including a high-level illustration of components of the lighting device.

In the example of FIG. 5A, the waveguide 540 may have a configuration that distributes the light generated by the light sources 520 and the array of micro projectors 525 towards respective sections of the output screen 550, such that the output surface (not shown) of the output screen 550 outputs corresponding light to the beam steering/shaping pixels 542 and display pixels 543. The waveguide 540 is optically coupled to the one or more light sources 520, and may have patterned refractive/reflective/diffractive/diffuse surface sections (not shown) configured to direct light received from the one or more light sources 520 toward an output of the waveguide 540. The waveguide 540 is configured to distribute substantially all of the light generated by the light sources 520 and the array of micro projectors 525 with minimal loss of light energy. The waveguide 540 is a form of "folded optics" where the light is confined within by total internal reflection.

On the output screen 550, the beam steering/shaping pixels 542 may be a number of individually controllable optical elements that make up a first set of controllable optics that are aligned with the waveguide to distribute light from the light sources according to a general illumination distribution selection. The display pixels 543 are also individually controllable optical elements that make up a second set of controllable optics that process, according to an image display selection, the light aimed by the array of micro-projectors reflected from the predetermined locations of the waveguide reflective surface to output an image.

The illustrated waveguide 540 approach enables beam steering/shaping pixels 542 and display pixels 543 of the output screen 550 to be in the same plane. Of course, the beam steering/shaping pixels 542 and display pixels 543 may be in different planes, and even multiple waveguides that provide separate lighting and display functions may be used. For example, the patterned output screen 550 may have multiple layers with a first layer closest to the waveguide 540 being a display pixel layer and a second layer closest to the illuminated surface 560 being a beam steering/shaping pixel layer, or vice versa.

The waveguide 540 and the array of micro-projectors 525 are configured to cooperate to enable the micro-projectors to deliver image light to the respective display pixels 543. The array of micro-projectors 525 may include one or more individually, controllable micro-projectors. For example, in response to control signals from the processor 510, the individual controllable micro-projectors aim output light at predetermined locations of the output surface of the waveguide 540. The array of micro-projectors 525 may be, for example, laser scanning-type micro-projectors where multiple lasers are directed onto a single analog tip/tilt MEMS mirror that scans multiple lasers with the laser brightness modulated based on the image selection. The micro-projectors of the array 525 are configured to direct or aim the lasers at corresponding points on the waveguide 540 that will deliver the generated light at a desired display pixel 543.

For the display part, the points on the waveguide 540, for example, may be configured to pass only certain wavelengths of light or light that is received from a particular direction. Different types of optics may be included in the waveguide 540 to enable the respective micro-projectors of the array of micro-projectors 525 to deliver image light to the respective display pixels 543. For example, small period holographic diffraction gratings which are highly wavelength and angle sensitive may be directly formed within or on the surface of the waveguide 540 to enable the array of micro-projectors 525 to deliver image light to the respective display pixels 543. Other waveguides based on patterned polarization, reflective, or reflective optics can also be used. As the processor 510 processes the image file, control signals are delivered to the micro-projector and, the image is presented on the display pixels of the output screen 550.

The output screen 550, for example, is configured to have a pattern of beam steering/shaping pixels 542 and display pixels 543. For example, the output screen includes a first set of optics and a second set of optics. When an image and a general illumination distribution have been selected and the output screen 550 pattern is viewed by an occupant of the space, the output screen 550 presents the selected image as well as providing the selecting general illumination distribution to the illuminated surface 560. For example, the pattern may be a checkerboard of beam steering/shaping pixels 542 and display pixels 543 or some other pattern that provides the same effect of enabling a viewer to discern an image and also receive the benefit of the general illumination distribution at the illuminated surface 560. The illuminated surface 560 may be a desktop, floor, wall, countertop or the like.

The beam steering/shaping pixels 542 and the display pixels 543 are controllable by the processor 510 via the output screen interface 545. The processor 510 controls the respective beam steering/shaping pixels 542 and display pixels 543 based on the image selection and the general illumination distribution selection stored in the configuration file 519'. In response to control signals from the processor 510, respective ones of the beam steering/shaping pixels 542 may controlled to provide a predetermined beam distribution and/or beam shape. In other examples, the beam steering/shaping pixels 542 may be controllable elements such as electrowetting devices, liquid crystal polarization gratings, or the like. The display pixels 543 may also be active or passive elements depending on the type projector and waveguide used. For example, if the micro-projector is a laser scanning-type micro-projector as described above, the waveguide may contain holographic gratings at specific points to extract only the laser light at specific angles from the projectors toward the output screen 550. In this case, the display pixels 543 may simply be passive diffusers that scatter the light received at those locations. In another example, where the display pixels and beam steering pixels are in different planes, the display pixels may be patterned nanophosphor materials that scatter only the specific colors such as the laser wavelengths of the projectors, but are transparent for the lighting wavelengths. In such cases, the waveguide 540 may be configured to uniformly distribute and extract the light from both light sources 520 and the micro projectors 525. The beam steering pixels 542 and display pixels 543 may be the whole area of the output screen 550 but may be located on different planes.

Figure 5B:
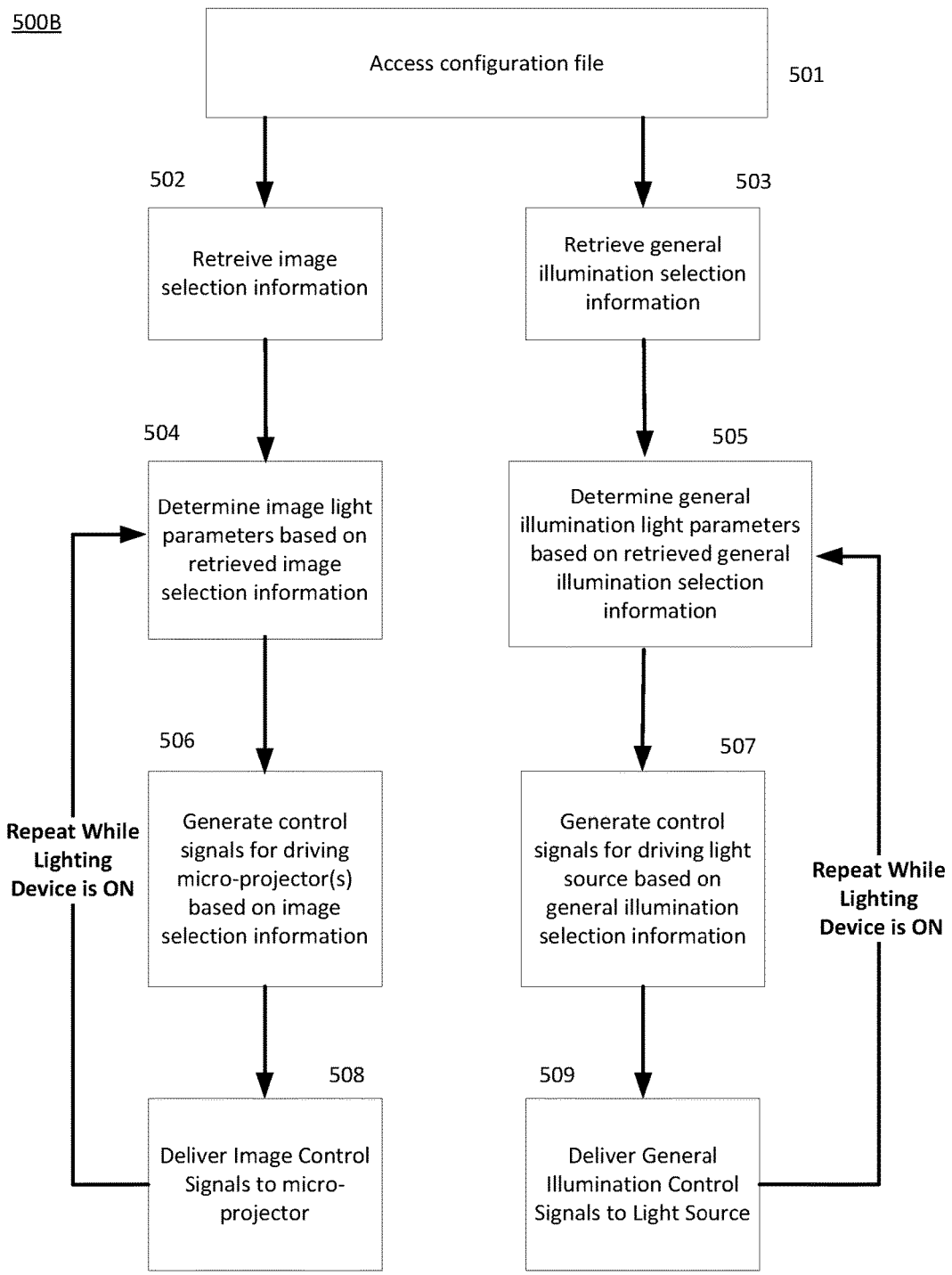
FIG. 5B is a flowchart of a process utilizing a waveguide approach for a software configurable lighting device, such as that shown in FIG. 5A.

An example of the operation of the waveguide approach is described with reference to FIG. 5B. FIG. 5B is a flowchart of a process utilizing a waveguide approach for a software configurable lighting device, such as that shown in FIG. 5A. In the operational example, a process 500B for utilizing the lighting device 500 will be described with reference to FIG. 5B.

The processor 510 accesses the configuration file 519' in memory 515 (Step 501). The processor 510, at Step 502, retrieves the image selection information. The processor 510 determines from the image selection information in the configuration file 519' that the array of micro projectors 525 is to be driven, in a first instance, to provide light for presenting a portion of an image. For example, the image selection information in the received configuration file may include data, such as light parameter data, an address of the display pixel 542 that the generated light is to be directed towards, and the like. The processor 510 determines image light parameters, such as intensity, color and a predetermined duration (that may be anywhere in the micro-second range to the millisecond range depending on the image refresh rate, resolution, and source brightness), from the image selection information in the received configuration file (Step 504), and, in response, generates control signals (Step 506) for causing one or more respective micro-projectors of the array of micro-projectors 525 to generate light having the determined image light parameters. Based on the determination, the processor 510 controls the array of micro-projectors 525 by delivering the image control signals to one or more micro-projectors of the array of micro-projectors 525 (Step 508). The image control signals include, for example, the address of the display pixel 543 that is to receive the image light having the determined light parameters. In response to the received control signals, the array of micro-projectors 525 generate/emit light for presenting the portion of the image at the addressed display pixel 543 of the output screen 550. Steps 506 and 508 repeat as the micro-projector of the array 525 rapidly transitions (e.g., in fractions of milliseconds) from one display pixel 543 to another display pixel of the output screen 550 so that a viewer sees a complete image in the output screen 550.

Simultaneously or substantially simultaneously to the steps 504, 506 or 508, the processor 510, at Step 503, retrieves general illumination selection information from the accessed configuration file. The processor 510 determines that the light sources 520 are to be driven to provide light for providing general illumination from the general illumination distribution selection information in the received configuration file. The processor 510 determines light parameters (Step 505), which in the case of a general illumination distribution selection are, for example, white colored or similar light at a maximum intensity, and/or a predetermined duration (that may be in the sub-millisecond range to avoid flicker), from the general illumination distribution selection information in the received configuration file. In response to the determination of the general illumination light parameters, the processor 510 generates control signals (Step 507) to cause the light sources 520 to generate light having the determined general illumination distribution light parameters. Upon generation of the control signals, the processor 510 delivers (Step 509) the generated control signals to the light source 520.

The determined image light parameters and determined general illumination distribution light parameters may also include setting information for the respective beam steering/shaping pixels 542 in order to deliver light according the general illumination distribution.

The above steps 504-509 of process 500B may be repeated while the lighting device is powered ON. For example, the steps may be repeated periodically or in response to a particular event (such as being provided with a new image for presentation, or the like). While the steps 502-508 and 503-509 are shown in parallel, in an alternative example, it is also envisioned that the steps 502-509 may be performed serially.

Of course, variations to the processes 500B are also envisioned. For example, the image selection information and the general illumination selection information may contain pre-generated control signals providing, for example, the respective general illumination light parameters and image light parameters that may be parsed from the respective selection information and simply delivered, respectively, to the array of micro-projectors 525 and the light source 520, thereby, omitting steps 504-507.

The system timing for providing the image presentation and general illumination in each of the examples illustrated in FIGS. 3A-5B may be performed using a number of different techniques. One technique includes time division multiplexing that enables the respective processors of FIGS. 5A and 5B to provide the selected image and general illumination distribution.

Figure 6A:
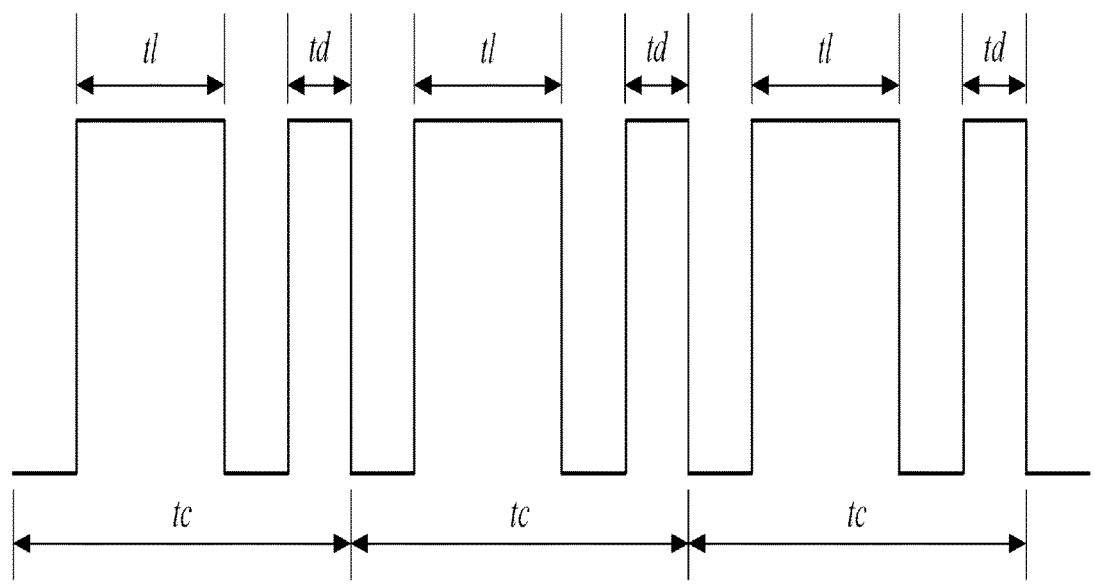
FIG. 6A is a timing diagram useful in understanding a time division multiplexing approached to the display and lighting functions of the projection and/or waveguide based software configurable lighting device.

FIG. 6A is a timing diagram useful in understanding a time division multiplexing approached to the described image display and general illumination lighting functions, such as those examples described with reference to FIGS. 3A and 5A. The drivers or processor may receive control signals that include timing signals for controlling the respective display and lighting functions based on a timing diagram like the simplified illustration of FIG. 6A.

In this example, the timing diagram shows a time cycle tc that includes time durations related to the general illumination lighting time duration tl and the image display presentation time period td. The example timing diagram may indicate timing for a specific general lighting duration and/or a particular type of image display, and is only an example. Other timing signals may be suitable depending upon different user selections and lighting conditions selected for a space or the like. The time cycle tc may be an arbitrary time duration. The time cycle tc is likely to be a duration that does not allow the transition from general illumination lighting during time period tl to presentation of the image display during period td to be discernible (e.g., as flicker, changes in contrast of objects in the room, or the like) by a person in the space. In addition, although the time durations tc, tl and td are shown as periodic, each of the respective time durations tc, tl and td may be aperiodic to enable different general illumination distributions and image displays. A more detailed example is provided with reference to FIG. 6B.

Figure 6B:
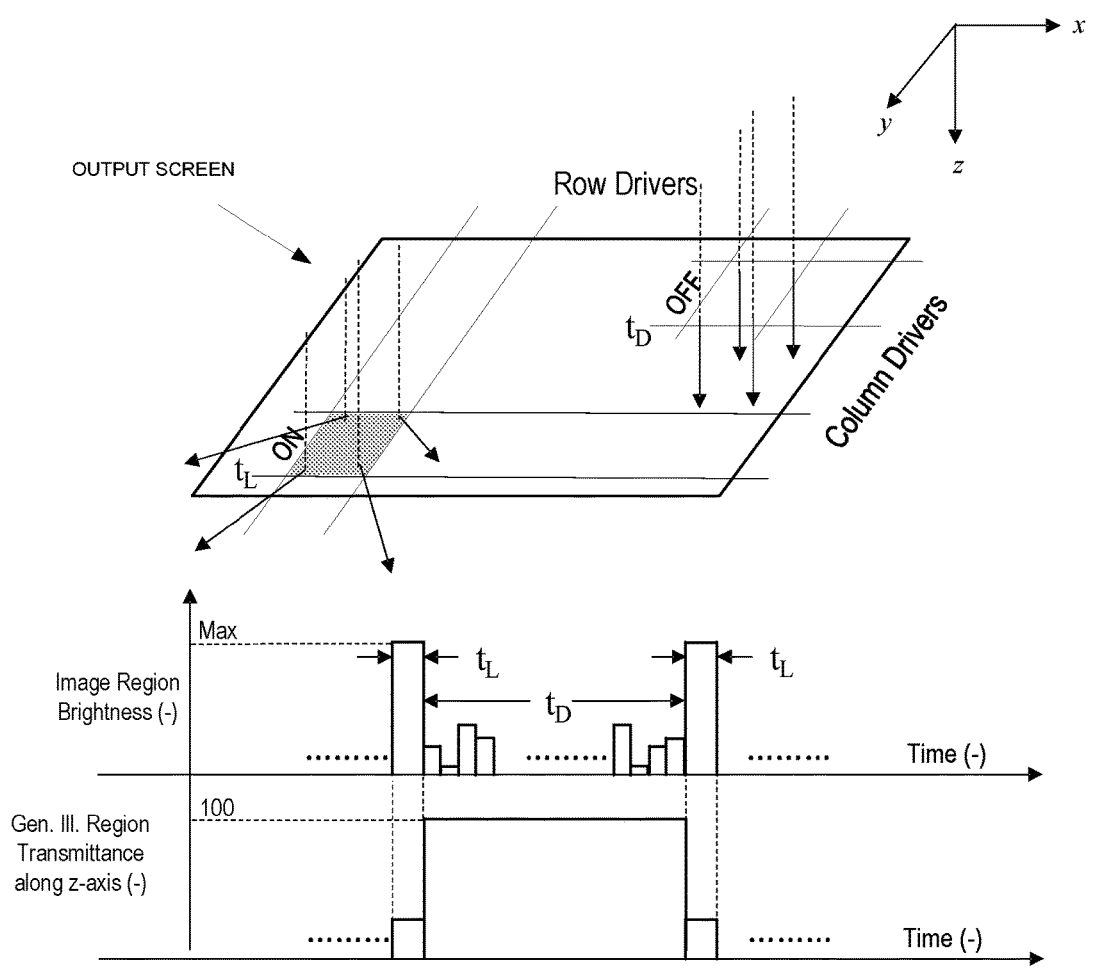
FIG. 6B is a functional diagram of an example of a time division multiplexing implementation of display and lighting functions of the projection and/or waveguide based software configurable lighting device.

FIG. 6B is a functional diagram of an example of a time division multiplexing implementation of display and lighting functions. The lighting devices of FIG. 5A may be configured to function according to the example of FIG. 6B. The light sources, for example, are configured to have brightness and color characteristics suitable for providing image display capability, and also have a high dynamic range to also provide selected general illumination. In an example, a lighting device, such as 500, includes a controller, such as processor 510, and a output screen, such as 550 (as shown in FIG. 5A). In the example, the output screen 550 may include a two dimensional display pixel array and a two dimensional beam steering/shaping array, either in the same plane or stacked in different planes. Each of the display pixels in the two dimensional display pixel array be switchable diffusers made from materials such as Polymer Dispersed Liquid Crystals (PDLCs). Each of the beam steering pixels in the two dimensional display pixel array may be controllable elements such as electrowetting devices, liquid crystal polarization gratings, or the like. Each of the respective arrays includes pixels that are responsive to control commands from the controller provided via an interface, such as output screen interface 545.

In the example, the time division multiplexing timing signals illustrated in the time lines at the bottom of FIG. 6B may be useable in the projection approach of FIGS. 3A and 3B. The time period tL corresponds to the part of the switching time cycle (e.g., tC of FIG. 6A) in which the light source 520 generated general illumination light, and the time period tD corresponds to the part of the switching time cycle when the array of micro-projectors generates image light. In the illustrated example, the control signal delivered by the processor 410 at the left most time tL is maximum brightness. The processor 410, based on the timing signals, outputs a signal to the reflector driver 425 and/or the output panel interface/driver 445 to drive the respective general illumination region to output a maximum light output in order that the lighting device may be used as a general illumination device.

Figure 7A:
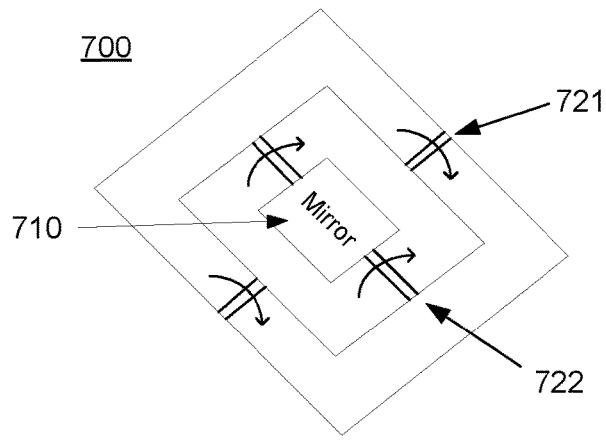
FIG. 7A illustrates an example of a single multi-dimensional micro-electrical mechanical system (MEMS) mirror that can rotate in multiple directions in response to an applied voltage, for example, for use as a movable reflector.

FIG. 7A illustrates an example of a single multi-dimensional micro-electrical mechanical system (MEMS) mirror. The MEMS device 700, for example, may be configured for use as a controllable beam steering reflector, such as 420 of FIG. 3A or 421 of FIG. 4A.

The MEMs mirror 710 of the MEMS device 700 is rotatable in multiple directions, such as a pan and tilt, around the 2 axis of rotation in response to an applied voltage. In some examples, the MEMs mirror 710 may move up and down similar to the movement of a piston, which may be in combination with the pan and tilt motions. A voltage applied to electrodes (not shown) may cause rotation in a first axial direction 721, and as the voltage changes, the mirror may rotate a number of degrees corresponding to the changes in voltage. Similarly, voltage applied to a different set of electrodes may cause the mirror 710 to rotate in a second axial direction 722. Unless the mirror is flexible, the rotation of the mirror 710 is limited to rotation in a single axial direction at one time. Only after stopping to rotate in the selected axial direction, such as 721, may the mirror 710 begin to rotate in the other axial direction, which is subsequently selected. In other examples, the structures enabling movement in axes 721 and 722 may be individually controllable on either side of the mirror to allow the mirror to tilt and pan in all directions. In addition, some examples enable an up and down piston-like movement that may also be combined with tilting and panning movements.

Figure 7B:
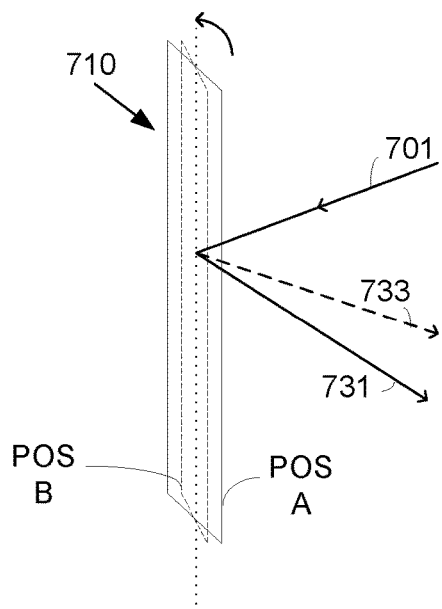
FIG. 7B shows how light direction changes due to rotation of the single multi-dimensional MEMS mirror of FIG. 7A.

FIG. 7B shows an example of a MEMS mirror causing the light direction being changed by the rotating mirror 710. For example, the incident light 701 from a light source (not shown in this example) is reflected in a particular direction 731 when the mirror 710 is in position A. In response to a control signal, the mirror 710 rotates to position B and the incident light 701 is reflected in a new direction 733.

Figure 7C:
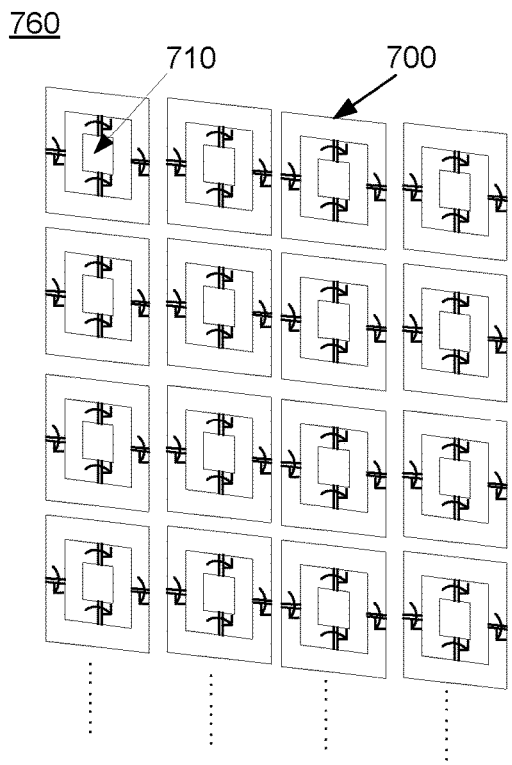
FIG. 7C shows an example MEMS mirror array formed from the single multi-dimensional MEMS of FIG. 7A that facilitates beam direction and beam direction.

It is envisioned that a number of MEMS devices 760 may be configured in an array. FIG. 7C shows a MEMS mirror array 1660 suitable for beam shaping and deflection, each single MEMS mirror 710 may be individually controlled to achieve the deflection angle required of a movable reflector in response to an input beam from a light source.

For example, each of the pixel spatial light modulators includes a micro-electro-mechanical systems (MEMs) mirror as shown in FIG. 7C. Each MEMS mirror 710 in the array 1660 is capable of changing position in response to commands from the processor and/or the driver. The position changes of the MEMs mirror 710 facilitates light beam shaping and light beam distribution.

The above discussion of FIGS. 7A-7C provides examples of different arrangements of spatial modulators that are controllable at the pixel level to provide beam shaping and beam steering functionalities. The advantages provided by the described examples allows for an image display of, for example, a virtual lighting fixture that is presented by an example of a described lighting device while providing selected general illumination distributions, including illumination that may not be provided by a physical lighting fixture that corresponds to the virtual lighting fixture.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

Figure 8A:
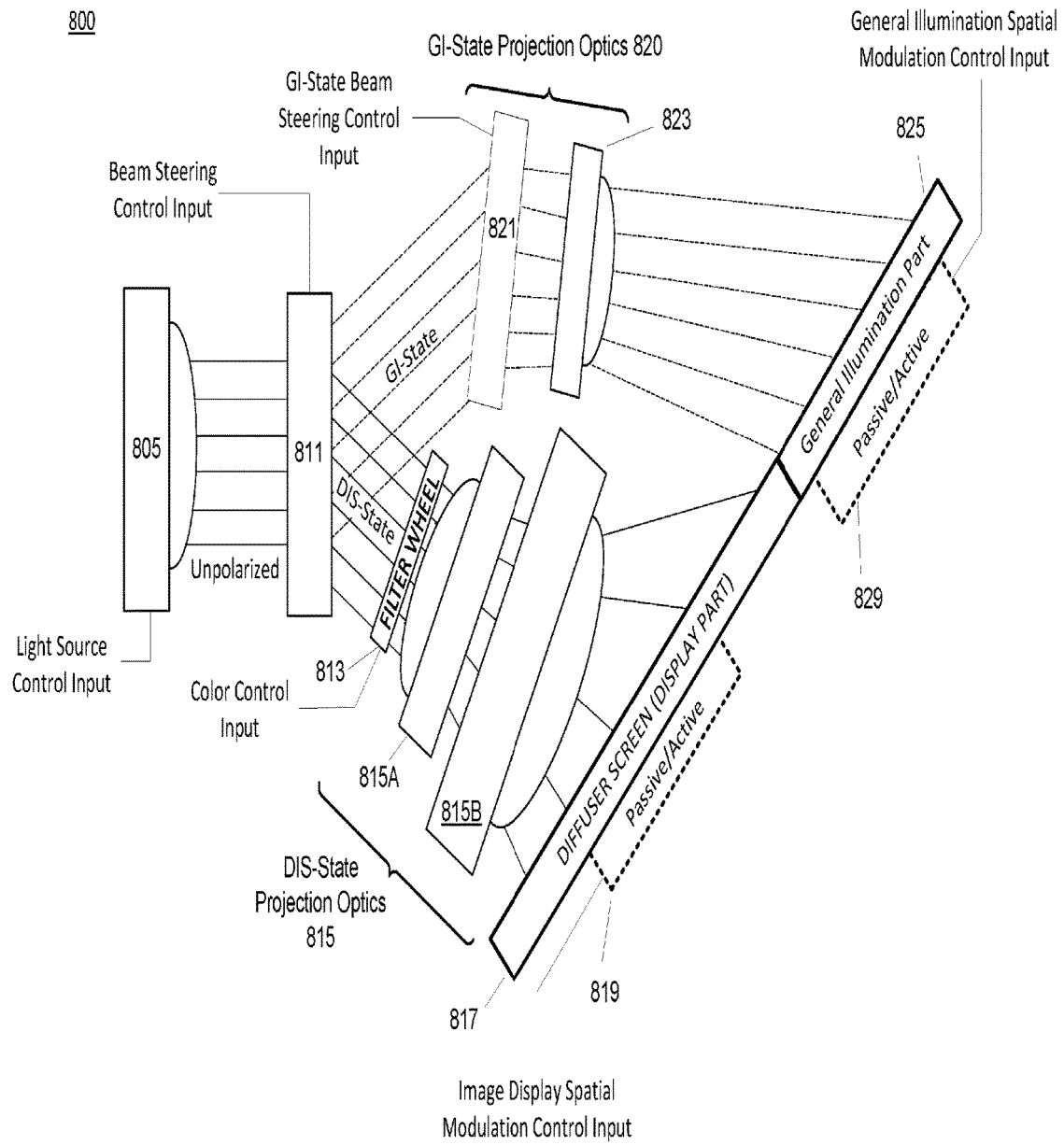
FIG. 8A shows an example of a modified ON/OFF state light recycling system usable with examples of a projection-based lighting devices such as lighting devices 11 shown in FIG. 2.

FIG. 8A shows an example of a modified ON/OFF state light recycling system usable with examples of lighting devices such as lighting devices 11 shown in FIG. 2.

The modified ON/OFF state recycling system 800 includes a light source 805, a light steering device 811, a color filtering device 813, Display (DIS)-State projection optics 815, a display part 817, General Illumination (GI)-State projection optics 820 and a general illumination part 825.

In the illustrated example, the modified ON/OFF state recycling system 800 has two light channels: an Display (DIS) channel and a General Illumination (GI) channel. The DIS channel is shown as the lower optical pathway and the GI channel is the upper optical pathway. When the system 800 is in a display-state (DIS-state), the DIS channel provides light to the display part 817, and when the system 800 is in a general illumination-state (GI-state), the GI channel provides light to the general illumination part 825. Both channels may utilize a single light source. The light source 805 is a collimated LED, lamp or laser diode that is configured to deliver unpolarized light to the light steering device 811. The steering device 811 is, for example, a two-dimensional (2D) Digital Micromirror Device (DMD)/Digital Light Processing (DLP) chip. The light steering device 811 is configured to switch, in response to a control signal from a controller, such as lighting controller 19 of FIG. 2 or microprocessor 123 of FIG. 1, between the DIS-state, which utilizes the DIS channel projection optics 815, and the GI-state, which utilizes the GI state projection optics 820.

The DIS channel provides the image display for the lighting device, such as lighting device 11 of FIG. 2. The DIS channel optical path includes the color filter wheel 813, DIS-State projection optics 815, and the diffuser screen (Display Part) 817. The DIS-State projection optics 815 include input colored-light lens 815A and colored-light output lens 815B. The input colored-light lens 815A disperses the input colored-light that is further input to colored-light output lens 815B. The colored-light output lens 815B further disperses the colored-light to substantially fill the diffuser screen 817 with the image display light.

The GI-state projection optics 820 also use a light steering device, device 821. As shown in the example of FIG. 8, the light steering devices 811 and 821 may be MEMS devices 811 and 821, such as those shown in FIGS. 7A-7C, to provide a lighting device that requires only a fraction of the brightness and spectrum of a display device. The GI channel provides the general illumination lighting for the lighting device, such as lighting device 11 of FIG. 2. The GI channel optical path includes the GI-State projection optics 820 and the general illumination part 825. The GI-State projection optics 820 include input light steering device 821 and light output lens 823. The light steering device 821 may be configured to steer the input light, for example, to a particular part of the light output lens 823, such as an upper portion of the output lens, depending upon general illumination control signals received from the controller. In other examples, the light steering device 821 may be controlled to deliver a uniform beam of light to the output lens 823, or deliver light to another part of the light output lens 823. Alternatively or, in addition, the light steering device 821 may also provide beam shaping, which disperses or narrows the input light, in response to the general illumination control signals received from the controller that are based on the general illumination distribution selection.

Figure 8B:
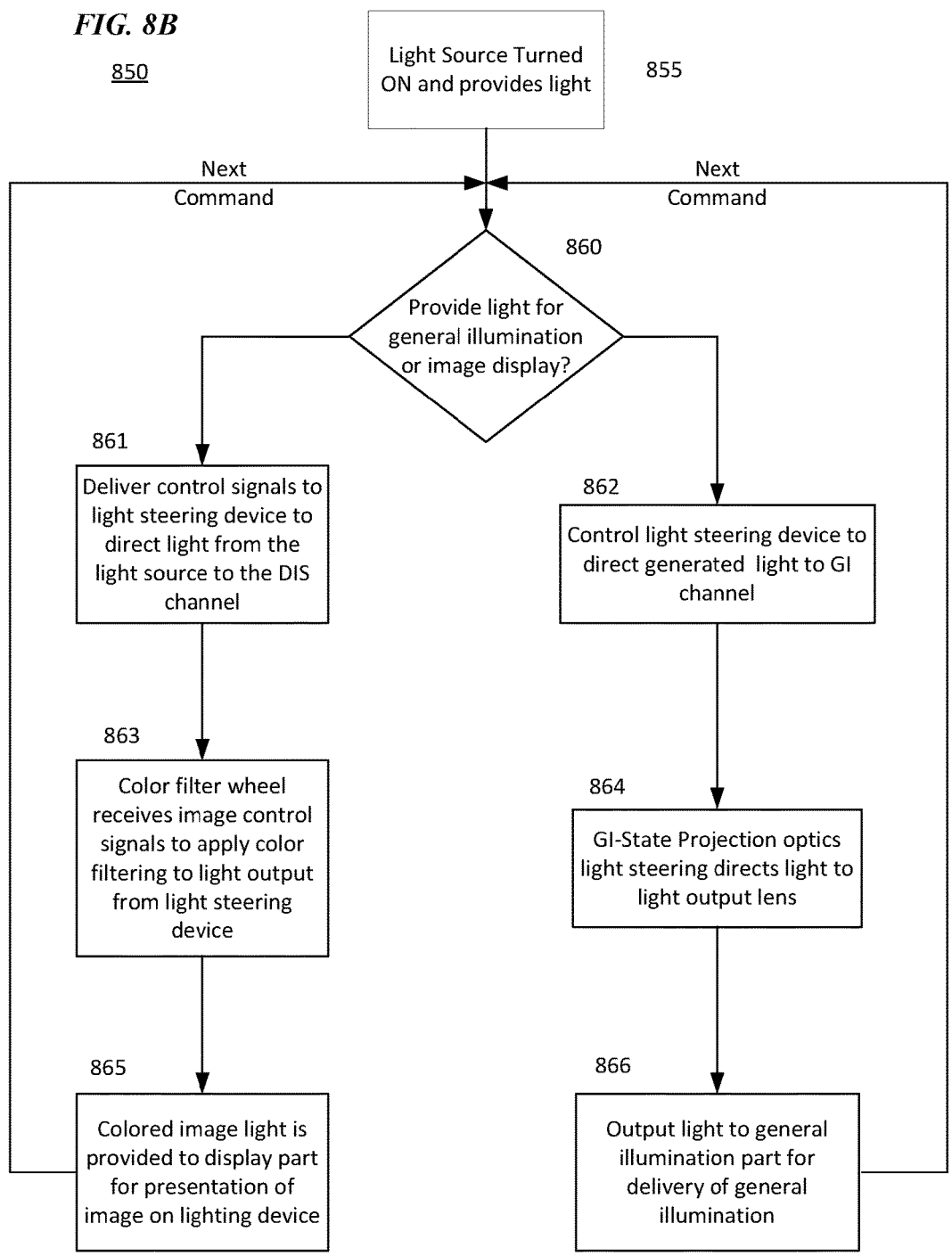
FIG. 8B illustrates a process in which the modified ON/OFF state light recycling system of FIG. 8A provides general illumination lighting and an image display from a projection-based lighting device such as lighting devices 11 of FIG. 2.

FIG. 8B illustrates an example of a process by which the modified ON/OFF state light recycling system provides general illumination lighting and an image presentation with examples of lighting devices such as lighting devices 11 shown in FIG. 2. The process 850 may be executed by a controller, such as light controller 19 of FIG. 2 or processor 115 of FIG. 1. The controller upon receipt of a configuration file parses out a general light distribution selection and/or an image display selection. The process 850 begins with the light source 805 being switched ON and outputting light based on control signals received from the controller (855). The brightness of the output light may be a maximum brightness, minimum brightness or a brightness between the minimum and maximum brightness capabilities of the light source 805. In some examples, the brightness may be fixed at a predetermined brightness, such as maximum brightness.

The controller may access configuration settings in a memory, such as memories 125, or be provided with the configuration settings by an external source, such as a user device 25, computing device 27 or server(s) 29. The controller generates control signals based on the accessed configuration settings, which may include, for example, light driver values, spatial modulator driver values, and other values for providing selected beam direction and/or beam shape, selected light quality and/or generated image(s) selections. Based on the configuration settings, the controller determines whether it is to provide general illumination or image control signals (860). For example, the controller parses image and general illumination settings and/or parameters from the configuration file to determine that an image is to be presented, which requires the light generated by the light source to be provided to the DIS state projection optics 815. In response to the determination, the controller delivers control signals to the light steering device 811 to direct light from the light source to the DIS channel (861). With the light being delivered to the DIS state projection optics 815, the controller provides the color filter wheel 813 with an image control signal (at 863) that sets the color filtering for the light to be delivered to the input colored-light lens 815A for output from the colored-light output lens 815B to the display part diffuser 817 (865). The process 850 returns to step 860 to determine whether light has to be provided for general illumination or image display. Upon a determination that light is to be provided for general illumination at 860, the controller provides a control signal to the light steering device 811 to direct the light to the GI channel projection optics (862). The controller further controls the light steering device 821 of the GI channel projection optics to deliver light of a particular orientation to the light output lens 823 (at 864). The light output lens 823 provides further processing and output to the general illumination part 825.

The light output lens 823 further processes the light according to its lens configuration, which may be fixed, for output to the general illumination part 825. For example, the output lens 823 may be configured to disperse the input light received from light steering device 823. In other some configurations, the output lens 823 may have regions with the lens structure that perform beam steering or beam shaping. The light is output from the output lens 823 to the general illumination part 825 for distribution as general illumination lighting (866). Upon providing the light for general illumination, the process 850 returns to 860 to determine whether light is to be provided for general illumination or an image display.

The timing of the return from either providing image display light or general illumination light in process 850, in some examples, is based on the image display selection and the general illumination distribution selection. The timing may be based on the time division multiplexing discussed above with reference to FIGS. 6A and 6B. Alternatively, the timing may be based on the details of the image display selection and/or the general illumination distribution selection. For example, if the lighting device has no image display selected and only has a general illumination distribution selection, the controller, in response, may provide control signals to the light steering device 811 to remain at a setting that only provides light to the GI channel projection optics 820. Alternatively, the lighting device may have only an image display selection and no general illumination distribution selection chosen. As a result, the controller may provide only image display control signals that direct the light steering device 811 to provide light to the DIS channel projection optics 815.

Optionally, each of the diffuser screen 817 and general illumination 825 may include passive or active spatial light modulators 819 and 829, respectively. Examples of passive spatial light modulators usable as spatial light modulators 819/829 include microlens devices, prismatic lens structures, diffusers, or the like. Examples of active spatial light modulators usable as spatial light modulators 819/829 include electrowetting lens, liquid crystal polarization gratings, switchable diffusers or the like.

In examples in which the optional spatial light modulators 819/829 are active spatial light modulators, the controller may provide spatial light modulator control signals to the respective active spatial modulators 819 and 829. The spatial light modulator control signals, for example, in the case of controlling general illumination distribution, may configure the active spatial modulator 829 to process the light according to the provided spatial light modulation control signals.

Figure 9:
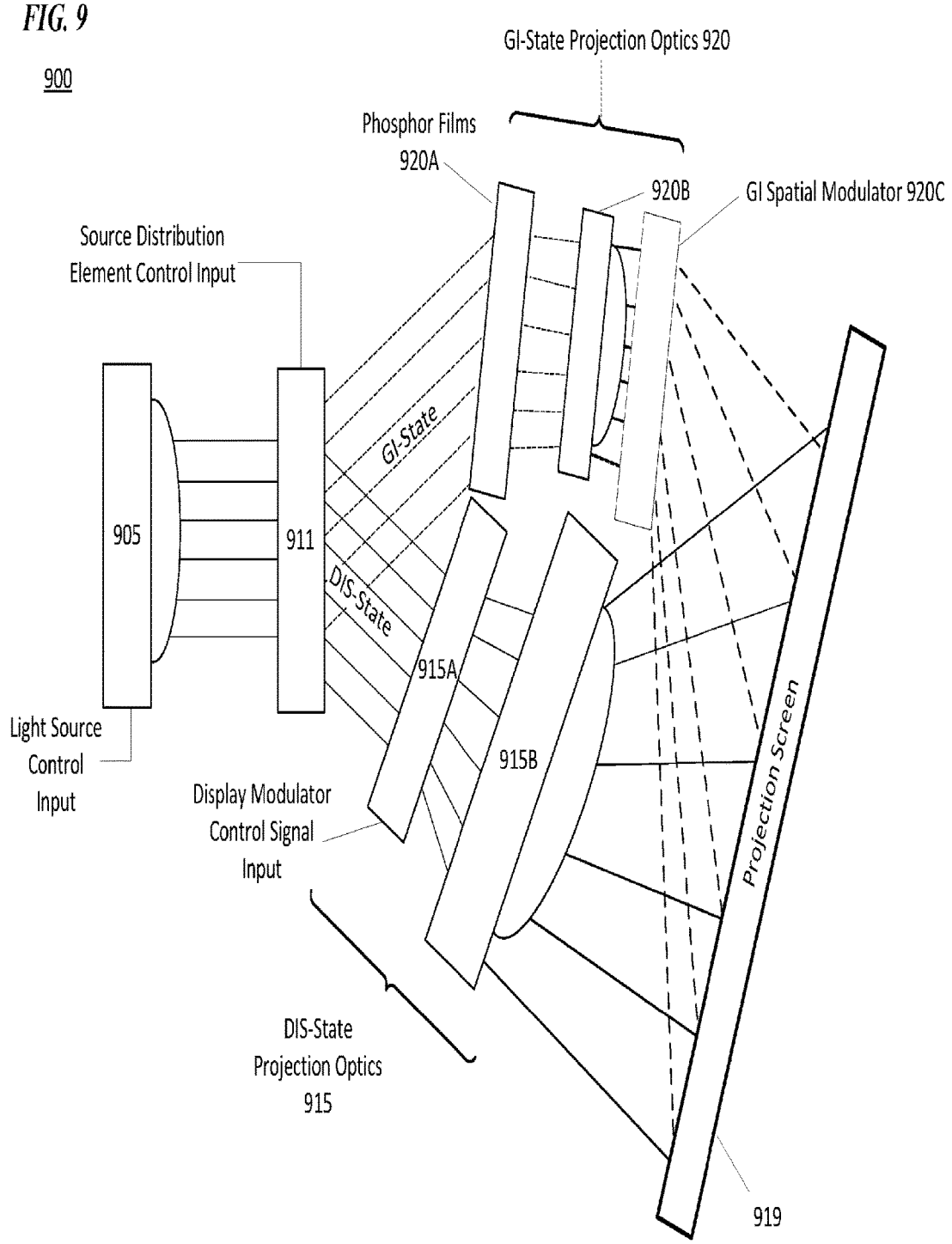
FIG. 9 shows another projection-based example based on the arrangement illustrated in FIG. 8.

FIG. 9 shows another projection-based example based on the arrangement illustrated in FIG. 8. The projection-based example illustrated in FIG. 9 may utilizes a controllable light source 905 for both display and illumination. Light source 905 may been an array of individual color emitters, such as R, G, B light emitting diodes (LEDs), super luminescent diodes (SLDs), or laser diodes (LD), or the like with collimation optics to guide the light from the source array towards a controllable source distribution element 911. The source distribution element 911, for example, in response to a control signal splits the light into two paths: one for general illumination (GI-State) and the other for display (DIS-State) purposes. For example, the source distribution element control 911 may be an array of fibers that are routed towards the respective GI-State and DIS-State channels. Alternatively, the controllable source distribution element 911 may be, for example, a DMD array that is time synchronized with controllable light source 905. The source distribution element 911 uses, for example, time division multiplexing in synchronization with the controllable light source 905 to split the light emitted by the controllable light source 905 into the respective GI-State and DIS-State channels. Yet another example for implementing controllable source distribution element 911 may include combinations of dichroic mirrors, diffraction gratings that are configured to selectively reflect/diffract a fraction of the colors within the spectrum of controllable light source 905 toward the respective DIS-State or GI-State channels.

In some examples, the respective GI-State and DIS-State channels contain optics to modulate the light correspondingly and project the light towards a common projection screen 919 where some/all of the area is shared between the general illumination and image display functions. For example, the GI-State projection optics 920 may include phosphor films 920A to convert the light from controllable light source 905 into light having a broad spectrum for achieving a Color Rendering Index (CRI) between approximately 80 and 98. Other optics included in the GI-State projection optics 920 may include lenses 920B, which, in the illustrated example, re-collimates the scattered light from the phosphor films 920A and guides the re-collimated light towards the spatial light modulator 920C. The spatial light modulator 920C shape and steer the re-collimated light towards the projection screen 919. The spatial light modulator 920C may be an array of electrowetting cells, another DMD array, liquid crystal polarization gratings, or the like.

The DIS-state projection optics 915 may include a controllable display modulator 915A which may be a DMD array. The display modulator 915A projects the image light through the optical lenses 915B towards the projection screen 919. The light in the DIS-State channel may be highly saturated into narrow color bands, such as R G B, to achieve a color gamut having a distribution of colors typically used in the generation and presentation of images, such as those projected onto the projection screen 919.

The projection screen 919 may be, for example, a simple passive diffusing film. In other cases, the projection screen 919 made of nanophosphor materials may be used that selectively scatter the light from the DIS path while being transparent for the GI-State channel. This increases the contrast-ratio of the projected image at the screen and also ensures that the light from the GI-State channel is not scattered and beam shaping/steering can be still accomplished through the screen. Of course, other examples may be envisioned based on FIG. 9.

Figure 11:
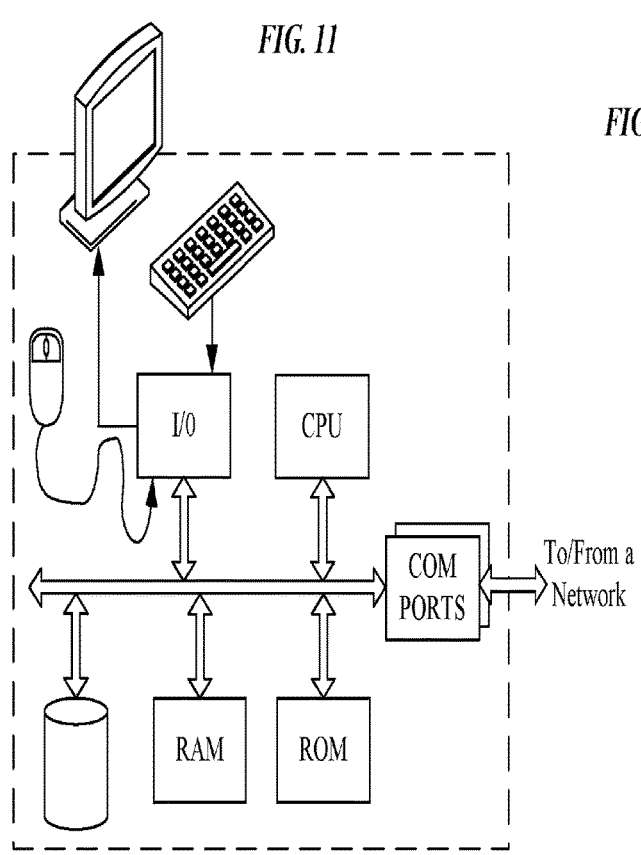
FIG. 11 is a simplified functional block diagram of a personal computer or other user terminal device, which may communicate with the lighting device of FIGS. 1, 2, 3A, 4A, and 5A.
Figure 10:
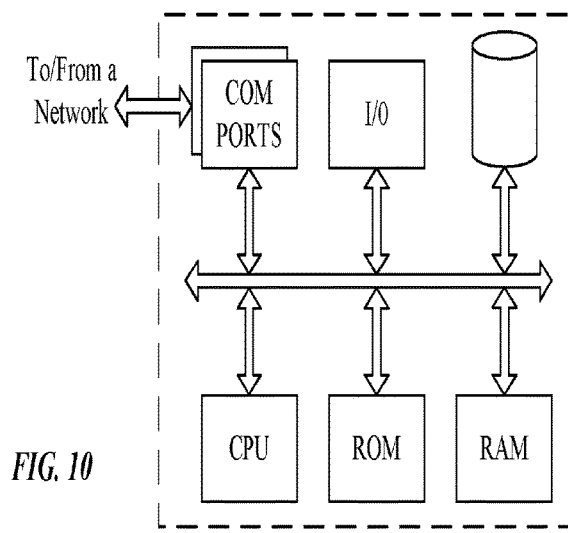
FIG. 10 is a simplified functional block diagram of a computer that may be configured as a host or server, for example, to supply configuration information or other data to the software configurable lighting device of FIGS. 1, 2, 3A, 4A, and 5A.

As shown by the above discussion, although many intelligent processing functions are implemented in the projection and/or waveguide lighting device, at least some functions may be implemented via communication with general purpose computers or other general purpose user terminal devices, although special purpose devices may be used. FIGS. 9-11 provide functional block diagram illustrations of exemplary general purpose hardware platforms.

Figure 12:
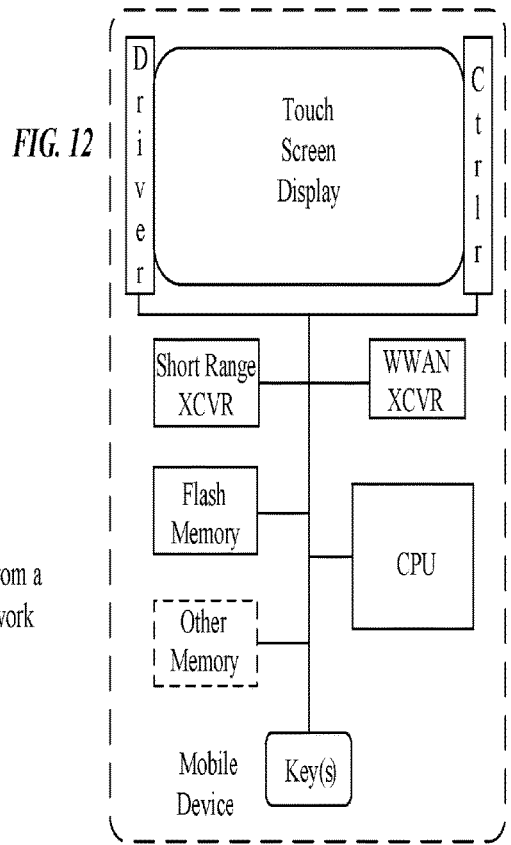
FIG. 12 is a simplified functional block diagram of a mobile device, as an alternate example of a user terminal device, for possible communication with the lighting device of FIGS. 1, 2, 3A, 4A, and 5A.

FIG. 10 illustrates a network computer platform or host computer platform, as may typically be used to generate and/or receive lighting device 11 control commands and access networks and devices external to the lighting device 11, such as host processor system 115 of FIG. 1. FIG. 11 depicts a computer with user interface elements as shown in FIG. 1, although the computer of FIG. 11 may also act as a server if appropriately programmed. The block diagram of a hardware platform of FIG. 12 represents an example of a mobile device, such as a tablet computer, smartphone or the like with a network interface to a wireless link, which may alternatively serve as a user terminal device for providing a user experience such as 190. It is believed that those skilled in the art are familiar with the structure, programming and general operation of such computer equipment and as a result the drawings should be self-explanatory.

A server (see e.g. a network computer platform of FIG. 10), for example, includes a data communication interface (i.e., com ports) for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. A server, such as that shown in FIG. 10, may be accessible or have access to a projection and/or waveguide lighting device 11 via the communication interfaces 117 of the projection and/or waveguide lighting device 11. For example, the server may deliver in response to a user request a configuration information file. The information of a configuration information file may be used to configure a software configurable lighting device, such as lighting device 11, to set light output parameters comprising: (1) light intensity, (2) light color characteristic and (2) spatial modulation, in accordance with the lighting device configuration information. In some examples, the lighting device configuration information include an image for display by the lighting device and at least one pixel level setting for at least one of beam steering or beam shaping by the lighting device. The configuration information file may also include information regarding the performance of the software configurable lighting device, such as dimming performance, color temperature performance and the like. The configuration information file may also include temporal information such as when to switch from one beam shape or displayed image to another and how long the transition from one state to another should take. Configuration data may also be provided for other states, e.g., for when the virtual luminaire is to appear OFF, in the same or a separate stored data file.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 11). A mobile device (see FIG. 12) type user terminal may include similar elements, but will typically use smaller components that also require less power, to facilitate implementation in a portable form factor. The example of FIG. 12 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 10 and the terminal computer platform of FIG. 10 are shown by way of example as using a RAM type main memory and a hard disk drive for mass storage of data and programming, whereas the mobile device of FIG. 12 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 11). The mobile device example in FIG. 12 uses a touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

The user device of FIG. 11 and the mobile device of FIG. 12 may also interact with the lighting device 11 in order to enhance the user experience 190. For example, third party applications 191 may correspond to control parameters of a software configurable lighting device, such as image presentation and general illumination. In addition, in response to the user controlled input devices, such as I/O of FIG. 11 and touchscreen display of FIG. 12, the lighting device, in some examples, is configured to accept input from a host of sensors, such as sensors 121. These sensors may be directly tied to the hardware of the device or be connected to the platform via a wired or wireless network. For example, a daylight sensor may be able to affect the light output from the illumination piece of the platform and at the same time change the scene of display as governed by the algorithms associated with the daylight sensor and the lighting platform. Other examples of such sensors can be more advanced in their functionality such as cameras for occupancy mapping and situational mapping.

As also outlined above, aspects of the techniques form operation of a projection and/or waveguide software configurable lighting device and any system interaction therewith, may involve some programming, e.g. programming of the lighting device or any server or terminal device in communication with the lighting device. For example, the mobile device of FIG. 12 and the user device of FIG. 11 may interact with a server, such as the server of FIG. 10, to obtain a configuration information file that may be delivered to a particular lighting device 11. Subsequently, the mobile device of FIG. 10 and/or the user device of FIG. 11 may execute programming that permits the respective devices to interact with the projection and/or waveguide software configurable lighting device 11 to provide control commands such as the DIS/GI command or a performance command, such as dim or provide control signals to operate components of the lighting device 11.

Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming and/or configuration file may at times be communicated through the Internet or various other telecommunication networks. Such communications, for example, may enable loading of the software from one computer or processor into another, for example, from a management server or host computer of the lighting system service provider into any of the lighting devices, sensors, user interface devices, other non-lighting-system devices, etc. of or coupled to the system 10 at the premises 15, including both programming for individual element functions and programming for distributed processing functions. Thus, another type of media that may bear the software/firmware program or data elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing data or instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting device, comprising:
   a memory;
   programming code stored in the memory;
   an electrically, controllable light source;
   a beam steering reflector having a movable reflective surface, wherein the orientation of the movable reflective surface is electrically controllable;
   an output panel comprising a control interface and two distinct regions, the two distinct regions including:
      a presentation region that outputs an image; and
      an addressable general illumination region, different from the presentation region, and having controllable states of opacity;
   a processor coupled to the memory, the light source, the beam steering reflector, and the control interface of the output panel, the processor, upon execution of the programming code stored in the memory, being configured to:
      set light output parameters to generate light by the light source;
      direct the generated light from the light source toward the addressable general illumination region of the output panel to pass through the addressable general illumination region as general illumination light to illuminate surrounding space of the output panel based on the controllable opacity of the addressable general illumination region of the output panel;
      retrieve image data from the memory;
      determine an address of the presentation region to which a portion of the image data is to be delivered;
      provide the portion of the image data to the addressed presentation region of the output panel via an output panel communication interface; and
      repeat the determining and providing for all portions of the image data until all portions of the image data are output from the output panel.

2. The lighting device of claim 1, wherein the output panel is optically aligned with the movable reflective surface.

3. The lighting device of claim 1, wherein the presentation region of the output panel comprises:
   an organic light emitting diode or a plasma display device, each of which is configured to present image data at an output of the output panel.

4. The lighting device of claim 1, further comprising:
presentation region image generation circuitry configured to provide image control signals to the presentation region according to an image selection file provided with a configuration file retrieved from the memory.

5. The lighting device of claim 1, wherein the output panel further comprises:
a spatial modulation layer having spatial modulators at the output side of the output panel, wherein the spatial modulators are:
positioned at the output side of the addressable general illumination regions; and
configured from one or more of: a controllable electrowetting cell, a liquid crystal polarization grating, a switchable diffusing surface, or a pixelated microlens assembly.

6. The lighting device of claim 1, wherein the output panel further comprises:
a spatial modulation layer including a number of individually controllable spatial modulators arranged in a matrix of spatial modulator pixels.

7. The lighting device of claim 1, wherein the controllable states of opacity allows different amounts of lights from the controllable light source to pass through for output from the addressable general illumination region of the output panel.

8. The lighting device of claim 1, wherein the processor is configured to address the general illumination region via the control interface to set opacity to one of the opacity states of the general illumination region according to the processed data to allow a selected amount of light from the controllable light source to pass through the addressable general illumination region as general illumination light.

* * * * *